(12) United States Patent
Gouda et al.

(10) Patent No.: US 9,794,508 B2
(45) Date of Patent: Oct. 17, 2017

(54) MONITORING DEVICE, MONITORING SYSTEM, AND MONITORING METHOD

(71) Applicant: PANASONIC INTELLECTUAL PROPERTY MANAGEMENT CO., LTD., Osaka (JP)

(72) Inventors: Youichi Gouda, Ishikawa (JP); Yuichi Matsumoto, Kanagawa (JP); Hiroaki Yoshio, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/025,999

(22) PCT Filed: Jul. 22, 2015

(86) PCT No.: PCT/JP2015/003667
§ 371 (c)(1),
(2) Date: Mar. 30, 2016

(87) PCT Pub. No.: WO2016/059740
PCT Pub. Date: Apr. 21, 2016

(65) Prior Publication Data
US 2016/0323532 A1 Nov. 3, 2016

(30) Foreign Application Priority Data

Oct. 17, 2014 (JP) .................................. 2014-212699

(51) Int. Cl.
*H04N 5/225* (2006.01)
*H04N 5/45* (2011.01)
(Continued)

(52) U.S. Cl.
CPC ........... *H04N 5/45* (2013.01); *G06K 9/00771* (2013.01); *G09G 5/00* (2013.01); *H04N 5/272* (2013.01);
(Continued)

(58) Field of Classification Search
CPC .......... H04N 7/18; H04N 7/183; H04N 5/225; H04N 5/222; H04N 11/02; G06K 9/00; G06K 9/00778; G06K 9/00342
(Continued)

(56) References Cited

U.S. PATENT DOCUMENTS 8,160,129 B2* 4/2012 Hirose ............. G08B 13/19602
375/240.01
8,264,545 B2* 9/2012 Suzuki ............... H04N 5/23212
348/169
(Continued)

FOREIGN PATENT DOCUMENTS

JP 10-322684 12/1998
JP 2006-217070 8/2006
(Continued)

OTHER PUBLICATIONS

International Search Report, dated Oct. 13, 2015, for the corresponding International Application No. PCT/JP2015/003667.

*Primary Examiner* — Trang U Tran
(74) *Attorney, Agent, or Firm* — Greenblum & Bernstein, P.L.C.

(57) ABSTRACT

A monitoring device is provided that includes a process condition setter that sets a target area on the monitored moving image according to a user's operation input. The device includes a stay information acquirer that observes a staying situation of a moving object appearing on the monitored moving image, and acquires stay information indicating the staying situation of the moving object. The
(Continued)

device also includes a sub-image generator that generates the sub-image, and a sub-image arrangement controller that controls an arrangement position of the sub-image on the monitored moving image based on the acquired stay information. The device further includes an output controller that generates the monitoring moving image in which the sub-image is composed on the monitored moving image based on the arrangement position of the sub-image determined by the sub-image arrangement controller, and outputs the monitoring moving image on a display.

8 Claims, 15 Drawing Sheets

(51) Int. Cl.
  *G09G 5/00* (2006.01)
  *H04N 7/18* (2006.01)
  *H04N 5/272* (2006.01)
  *G06K 9/00* (2006.01)

(52) U.S. Cl.
  CPC ............. *H04N 7/181* (2013.01); *H04N 7/183* (2013.01); *G09G 2340/045* (2013.01); *G09G 2340/0464* (2013.01); *G09G 2340/12* (2013.01); *G09G 2340/14* (2013.01)

(58) Field of Classification Search
  USPC .................................... 348/169, 345, 333.02
  See application file for complete search history.

(56) References Cited

U.S. PATENT DOCUMENTS

| | | | |
|---|---|---|---|
| 8,355,045 | B2 | 1/2013 | Sotodate |
| 2009/0009598 | A1 | 1/2009 | Sotodate |
| 2010/0013977 | A1 | 1/2010 | Suzuki |
| 2015/0187088 | A1* | 7/2015 | Iwai ................... G06K 9/00771 345/634 |
| 2015/0278608 | A1 | 10/2015 | Matsumoto et al. |

FOREIGN PATENT DOCUMENTS

| | | |
|---|---|---|
| JP | 2011-248836 | 12/2011 |
| JP | 2014-016507 | 1/2014 |
| JP | 5597762 | 10/2014 |
| JP | 5597781 | 10/2014 |
| JP | 2015-125671 | 7/2015 |
| JP | 2015-186202 | 10/2015 |
| WO | 2008/072374 | 6/2008 |

* cited by examiner

MONITORING DEVICE, MONITORING SYSTEM, AND MONITORING METHOD

TECHNICAL FIELD

The present invention relates to a monitoring device, a monitoring system, and a monitoring method that generate a monitoring moving image in which a sub-image relating to a target area set on a monitored moving image is superimposed on the monitored moving image, and display the monitoring moving image on a display device.

BACKGROUND ART

In a store such as a convenience store, a monitoring system is widespread, in which a camera that captures images of the inside of the store is installed, a monitored moving image captured by the camera is displayed on a monitor, and then, situations in the store are monitored. In the monitoring system described above, if a focused area in the monitored moving image is designated and the image of the area is enlarged to be displayed, a state of a person in the focused area can be observed in detail, and thus, it is possible to accurately and efficiently execute a monitoring operation.

In a case where the focused area in the monitored moving image is enlarged and displayed as described above, a method of so-called picture in picture (P in P) may be used, in which the enlarged image is superimposed on the monitored moving image as a sub-image. However, if the sub-image is simply superimposed and displayed only on the designated area, the original image of the designated area and portions in the vicinity thereof are hidden by the sub-image, which results in hindrance to the monitoring operation. Therefore, it is desirable to arrange the sub-image at the position different from the designated area on the monitored moving image.

In the P in P method described above, as a technology of arranging a sub-image on a position different from the designated area on the monitored moving image, a technology, in which an enlarged image of an area where an abnormality has occurred is arranged at the corner of the monitored moving image as the sub-image, is known in the related art (refer to PTL 1). In addition, a technology is known, in which a best shot of a person's face image is arranged at a region where there is no motion (stationary block), that is, at a region where a person is not present as a sub-image (refer to PTL 2).

CITATION LIST

Patent Literature

PTL 1: Japanese Patent Unexamined Application Publication No. 10-322684
PTL 2: Japanese Patent Unexamined Application Publication No. 2006-217070

SUMMARY OF INVENTION

In the technology disclosed in PTL 1, since an enlarged image of an area where an abnormality has occurred is superimposed and displayed on a monitored moving image as a sub-image, it is possible to observe in detail a situation of the area where the abnormality has occurred. However, the sub-image is simply arranged at the corner of the monitored moving image without considering the specific position on a monitored moving image where the sub-image is arranged. Therefore, in the monitored moving image, there is a case where an area having a high relevance to the focused area, that is, the area where the abnormality has occurred, is hidden. In a case of such a state, there is a problem in that the monitoring operation may be hindered.

In addition, in the technology disclosed in PTL 2, since a best shot of a person's face image is arranged at a region where a person is not present as a sub-image, it is possible to prevent the sub-image from becoming an obstacle to the monitoring operation. However, if a monitoring area is in a congested situation and a large number of persons are present in the entire monitored moving image, it is difficult to find an area where there is no motion (stationary block), and thus, there is a problem in that it is not possible to appropriately cope with the congested situation. Therefore, it is desirable to develop a technology in which the sub-image can be arranged on an appropriate position on the monitored moving image regardless of the situation of the monitoring area.

The present invention is intended to solve such problems in the related art, and a major object of the present invention is to provide a monitoring device, a monitoring system, and a monitoring method that is configured to be capable of efficiently performing the monitoring operation by arranging the sub-image relating to the area designated on the monitored moving image on the appropriate position on the monitored moving image without the monitoring operation being hindered by the sub-image.

A monitoring device according to the present invention generates a monitoring moving image in which a sub-image relating to a target area set on a monitored moving image is superimposed on the monitored moving image, and displays the monitoring moving image on a display device. The monitoring device includes: a target area setter that sets the target area on the monitored moving image according to a user's operation input; a stay information acquirer that observes a staying situation of a moving object appearing on the monitored moving image and acquires stay information indicating the staying situation of the moving object; a sub-image generator that generates the sub-image; a sub-image arrangement controller that controls an arrangement position of the sub-image on the monitored moving image based on the stay information acquired by the stay information acquirer; and an output controller that generates the monitoring moving image in which the sub-image is composed on the monitored moving image based on the arrangement position of the sub-image determined by the sub-image arrangement controller and outputs the monitoring moving image on the display device.

In addition, a monitoring system according to the present invention generates a monitoring moving image in which a sub-image relating to a target area set on a monitored moving image is superimposed on the monitored moving image, and displays the monitoring moving image on a display device. The monitoring system includes: a camera that images the monitoring area; a plurality of information processing devices; and a display device that displays the monitoring moving image. Furthermore, any of the plurality of information processing devices includes: a target area setter that sets the target area on the monitored moving image according to a user's operation input; a stay information acquirer that observes a staying situation of a moving object appearing on the monitored moving image and acquires stay information indicating the staying situation of the moving object; a sub-image generator that generates the sub-image; a sub-image arrangement controller that controls an arrangement position of the sub-image on the monitored moving image based on the stay information acquired by the stay information acquirer; and an output controller that generates the monitoring moving image in which the sub-image is composed on the monitored moving image based on the arrangement position of the sub-image determined by the sub-image arrangement controller and outputs the monitoring moving image on the display device.

In addition, a monitoring method according to the present invention causes an information processing device to generate a monitoring moving image in which a sub-image relating to a target area set on a monitored moving image is superimposed on the monitored moving image, and to display the monitoring moving image on a display device. The monitoring method includes: a step of setting the target area on the monitored moving image according to a user's operation input; a step of observing a staying situation of a moving object appearing on the monitored moving image and acquiring stay information indicating the staying situation of the moving object; a step of generating the sub-image; controlling an arrangement position of the sub-image on the monitored moving image based on the stay information; and a step of generating the monitoring moving image in which the sub-image is composed on the monitored moving image based on the arrangement position of the sub-image determined by the step and outputting the monitoring moving image on the display device.

According to the present invention, since the arrangement position of the sub-image on the monitored moving image is controlled based on the staying situation of the moving object, it is possible to arrange the sub-image on the appropriate position on the monitored moving image. Therefore, it is possible to efficiently perform the monitoring operation without the monitoring operation being hindered by the sub-image.

DESCRIPTION OF EMBODIMENTS

Figure 1:
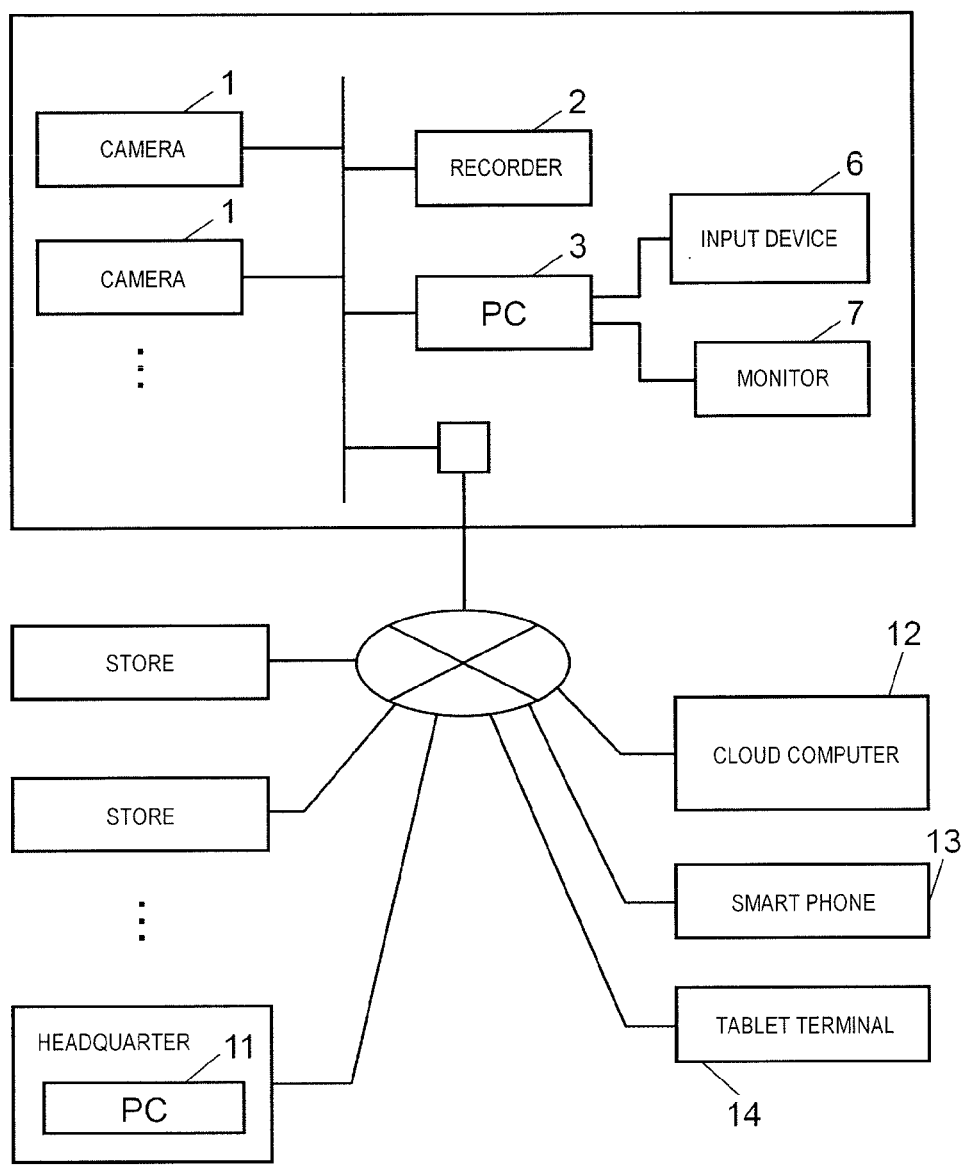
FIG. 1 is an overall configuration diagram of a monitoring system in a first exemplary embodiment.

According to a first aspect of the invention, a monitoring device generates a monitoring moving image in which a sub-image relating to a target area set on a monitored moving image is superimposed on the monitored moving image, and displays the monitoring moving image on a display device. The monitoring device includes: a target area setter that sets the target area on the monitored moving image according to a user's operation input; a stay information acquirer that observes a staying situation of a moving object appearing on the monitored moving image and acquires stay information indicating the staying situation of the moving object; a sub-image generator that generates the sub-image; a sub-image arrangement controller that controls an arrangement position of the sub-image on the monitored moving image based on the stay information acquired by the stay information acquirer; and an output controller that generates the monitoring moving image in which the sub-image is composed on the monitored moving image based on the arrangement position of the sub-image determined by the sub-image arrangement controller and outputs the monitoring moving image on the display device.

According to this configuration, since the arrangement position of the sub-image on the monitored moving image is controlled based on the staying situation of the moving object, it is possible to arrange the sub-image on the appropriate position on the monitored moving image. Therefore, it is possible to efficiently perform the monitoring operation without the monitoring operation being hindered by the sub-image.

In addition, according to a second aspect of the invention, the stay information is configured to include information relating to a number-of-stays which is the number of moving objects staying in the observation area set on the monitored moving image and a time-of-stays which is a time in which the moving object stays in the observation area.

According to this configuration, since the arrangement position of the sub-image is controlled by the number-of-stays and the time-of-stays, it is possible to arrange the sub-image on the appropriate position.

In addition, according to a third aspect of the invention, the sub-image arrangement controller is configured to determine the arrangement position of the sub-image based on the stay information under a condition that a relevance to the target area relating to the staying state of the moving object is low.

According to this configuration, the sub-image is arranged at the area of which the relevance to the target area is low and the area of which the relevance to the target area is high is not hidden by the sub-image. Therefore, it is possible to prevent the monitoring operation from being hindered.

In addition, according to a fourth aspect of the invention, the sub-image arrangement controller determines which of the staying state and the non-staying state the target area is in based on the stay information. Then, in a case where the target area is determined to be in the staying state, the arrangement position of the sub-image is determined under a condition that both of the values the number-of-stays and the time-of-stays are small. In a case where the target area is determined to be in the non-staying state, the arrangement position of the sub-image is determined under the condition that the value of the number-of-stays becomes small and the value of the time-of-stays becomes large.

According to this configuration, since the sub-image is arranged at the area where the number of moving objects is small, it is possible to completely prevent the moving objects from being hidden by the sub-image. Then, in a case where the user focuses on the area where the moving objects are staying and a part of the area where the moving objects are staying is designated as the target area, the target area is in the staying state. In addition, in a case where the sub-image is arranged at the area where the moving objects are flowing or the user focuses on the area where the moving objects are flowing and a part of the area where the moving objects are flowing is designated as the target area, the target area is in the non-staying state, and thus, the sub-image is arranged at the area where the moving objects are staying. Therefore, the area focused by the user is not hidden by the sub-image, and thus, it is possible to prevent the monitoring operation from being hindered by the sub-image.

In addition, according to a fifth aspect of the invention, the sub-image arrangement controller is configured to acquire an evaluation value indicating a degree of the relevance between a plurality of candidate areas which is a candidate for the arrangement position of the sub-image and the target area based on the stay information, and then, to select the best candidate area under a condition that the evaluation value is small, and determines the arrangement position of the sub-image based on the selected candidate area.

According to this configuration, the best candidate area can be simply and accurately searched for, and thus, it is possible to efficiently determine the arrangement position of the sub-image with high accuracy.

In addition, according to a sixth aspect of the invention, the sub-image arrangement controller is configured to detect a direction of the moving object appearing on the original image of the target area and to determine the arrangement position of the sub-image based on the detection result.

According to this configuration, the sub-image corresponding to the target area can be found quickly by the user seeing the direction of the moving object appearing in the original image of the target area on the monitoring moving image. Therefore, it is possible to further improve the efficiency of the monitoring operation.

In addition, according to a seventh aspect of the invention, the sub-image generator is configured to generate an enlarged image which is enlarged from the original image of the target area as the sub-image.

According to this configuration, the enlarged image which is enlarged from the original image of the target area is superimposed and displayed on the monitored moving image as the sub-image. Therefore, it is possible to observe in detail the state of the moving object in the focused area.

In addition, according to an eighth aspect of the invention, a monitoring system generates a monitoring moving image in which a sub-image relating to a target area set on a monitored moving image is superimposed on the monitored moving image, and displays the monitoring moving image on a display device. The monitoring system includes: a camera that images the monitoring area; a plurality of information processing devices; and a display device that displays the monitoring moving image. Furthermore, any of the plurality of information processing devices includes: a target area setter that sets the target area on the monitored moving image according to a user's operation input; a stay information acquirer that observes a staying situation of a moving object appearing on the monitored moving image and acquires stay information indicating the staying situation of the moving object; a sub-image generator that generates the sub-image; a sub-image arrangement controller that controls an arrangement position of the sub-image on the monitored moving image based on the stay information acquired by the stay information acquirer; and an output controller that generates the monitoring moving image in which the sub-image is composed on the monitored moving image based on the arrangement position of the sub-image determined by the sub-image arrangement controller and outputs the monitoring moving image on the display device.

According to this configuration, similar to the first aspect of the invention, it is possible to efficiently perform the monitoring operation by arranging the sub-image relating to the area designated on the monitored moving image on the appropriate position on the monitored moving image without the monitoring operation being hindered by the sub-image.

In addition, according to a ninth aspect of the invention, a monitoring method causes an information processing device to generate a monitoring moving image in which a sub-image relating to a target area set on a monitored moving image is superimposed on the monitored moving image, and to display the monitoring moving image on a display device. The monitoring method includes: a step of setting the target area on the monitored moving image according to a user's operation input; a step of observing a staying situation of a moving object appearing on the monitored moving image and acquiring stay information indicating the staying situation of the moving object; a step of generating the sub-image; a step of controlling an arrangement position of the sub-image on the monitored moving image based on the stay information; and a step of generating the monitoring moving image in which the sub-image is composed on the monitored moving image based on the arrangement position of the sub-image and outputting the monitoring moving image on the display device.

According to this configuration, similar to the first aspect of the invention, it is possible to efficiently perform the monitoring operation by arranging the sub-image relating to the area designated on the monitored moving image on the appropriate position on the monitored moving image without the monitoring operation being hindered by the sub-image.

Hereinafter, exemplary embodiments of the present invention will be described with reference to the drawings.

First Exemplary Embodiment

FIG. 1 is an overall configuration diagram of a monitoring system in a first exemplary embodiment. This monitoring system is a system structured for a retail store or the like such as a super market, and includes camera 1, recorder (moving image accumulation device) 2, and PC (monitoring device) 3.

Camera 1 is installed at an appropriate place in the store and images of the inside of the store (monitoring area) are captured by camera 1 and the obtained moving images are accumulated in recorder 2.

Input device 6 such as a mouse by which a user such as a store manager performs various operation inputs and monitor (display device) 7 on which the monitoring screen is displayed are connected to PC 3. By the monitoring screen displayed on monitor 7, the user can view the moving image of the inside of the store captured by camera 1 on a real time basis, and can view the past moving image of the inside of the store recorded in recorder 2.

In addition, camera 1, recorder 2, and PC 3 are respectively installed in a plurality of stores, and PC 11 is installed in a headquarters that manages the plurality of stores. In PC 11, the moving image of the inside of the store captured by camera 1 can be viewed in a real time basis, and the past moving image of the inside of the store recorded in recorder 2 can be viewed. In this way, it is possible to check the situation in the stores at the headquarters.

In the present exemplary embodiment, PC 3 installed in the store is configured as a monitoring device that monitors a state of persons or commodities in the store, and the user, for example, the store manager of each store can view a monitoring moving image generated by PC 3 on PC 3. Furthermore, the monitoring moving image is transmitted to PC 11 installed in the headquarters and the user at the headquarters side, for example, a supervisor who performs a guidance and suggestion for each of the stores in the responsible region can view the image. Thus, PC 3 and PC 11 are configured as a viewing device to view the monitoring moving image.

Figure 2:
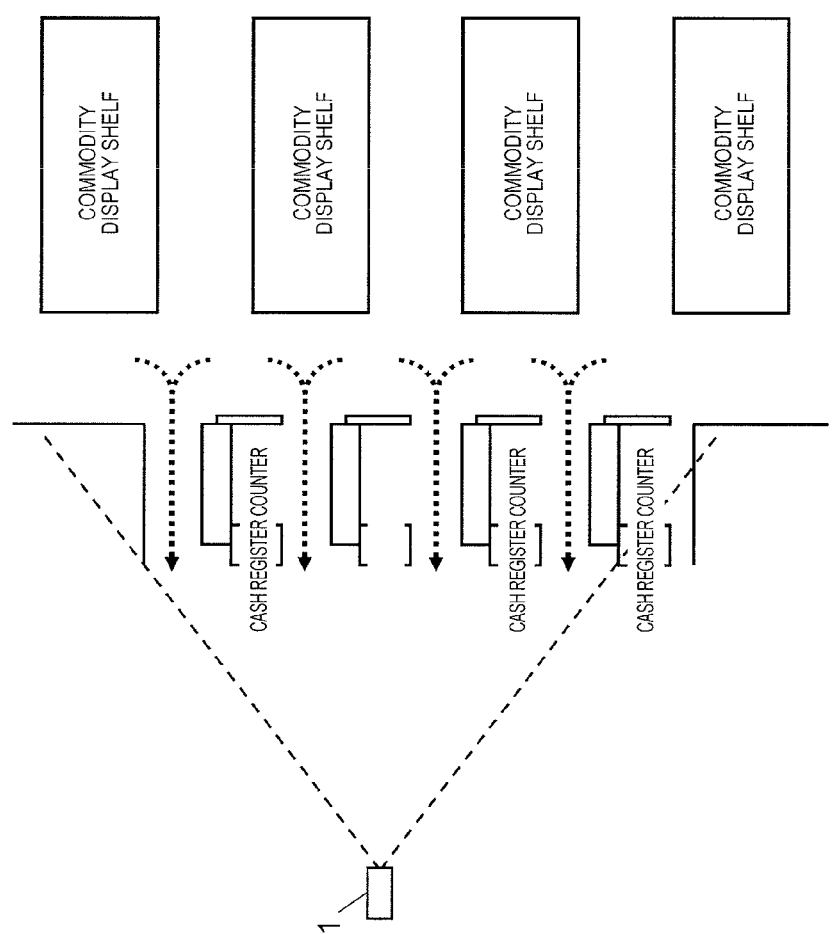
FIG. 2 is a plan view of an installation situation of camera 1 in a store.

Next, the installation situation of the camera 1 in each store will be described. FIG. 2 is a plan view of an installation situation of camera 1 in the store.

Commodity display shelves and cash register counters are provided in the store. Customers take a desired commodity from the commodity display shelf and perform payment at the cash register counter. At this time, the customer enters the cash register counter from a commodity display area side where the commodity display shelves are provided and leaves the cash register counter upon finishing the payment. Camera 1 is installed so as to image the customer entering the cash register counter from the front. Therefore, it is possible to perform detection of a person from the monitored moving image captured by camera 1. In addition, in the store, camera 1 is installed so as to image a customer passing through paths between the commodity display shelves or a customer choosing a commodity in front of the commodity display shelf.

Figure 3A:
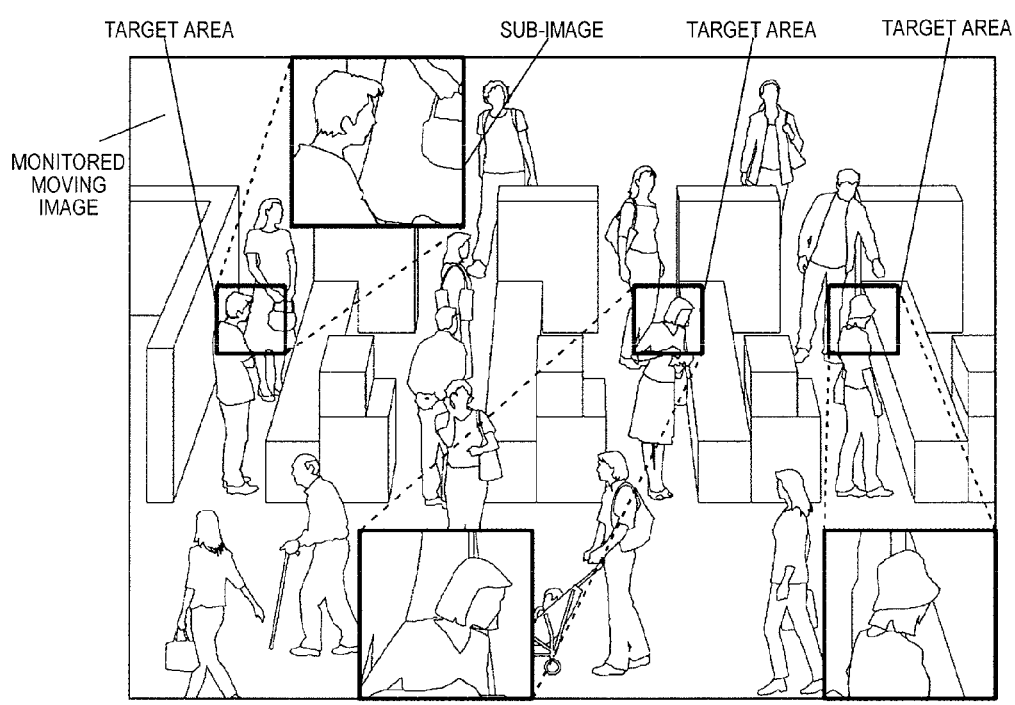
FIG. 3A is an explanatory diagram illustrating a monitoring moving image displayed on monitor 7.
Figure 3B:
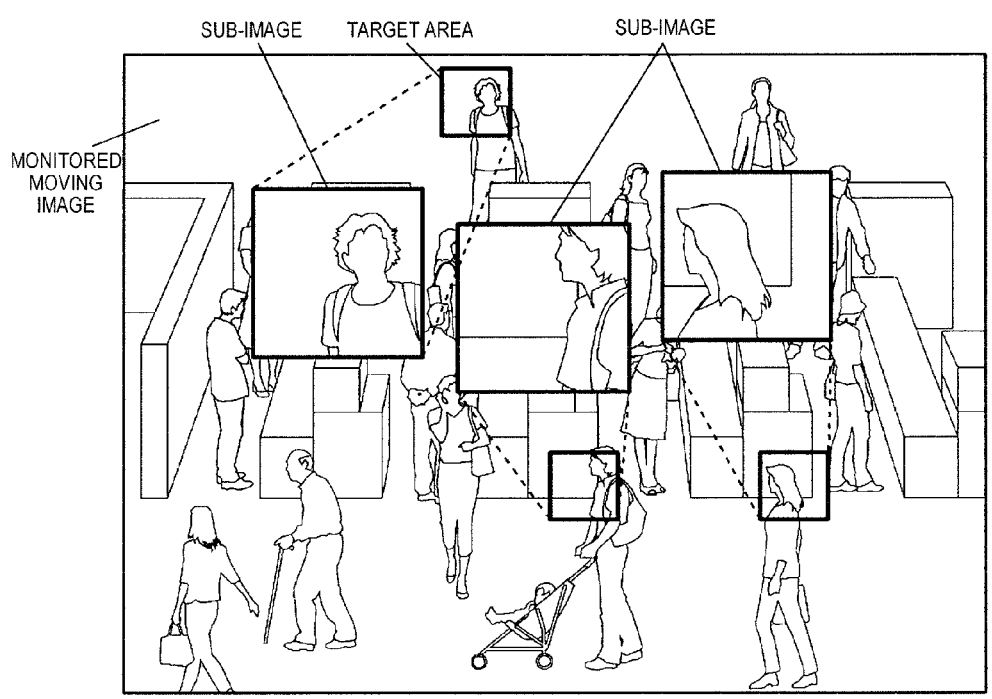
FIG. 3B is an explanatory diagram illustrating a monitoring moving image displayed on monitor 7.
Figure 4:
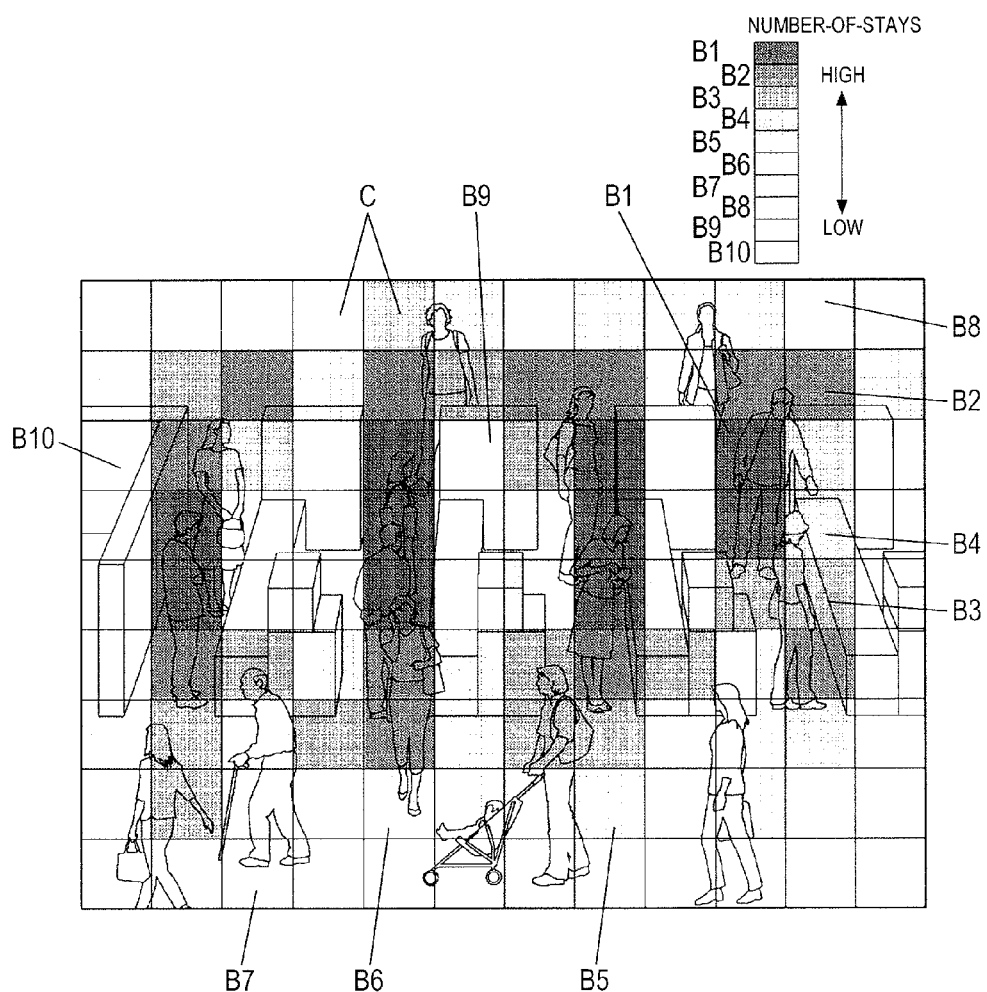
FIG. 4 is an explanatory diagram explaining stay information generated by processing performed by PC 3.
Figure 5:
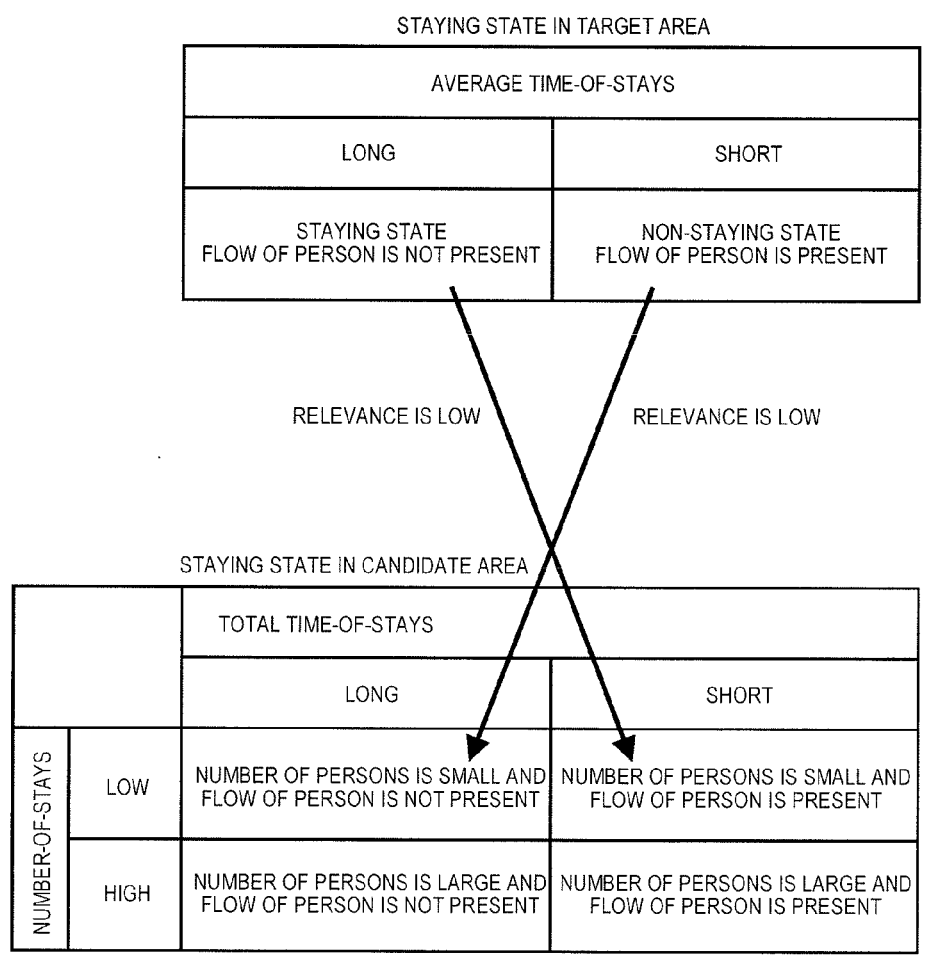
FIG. 5 is an explanatory diagram explaining an overview of the processing performed by PC 3.

Next, an overview of processing performed by PC 3 illustrated in FIG. 1 will be described. FIGS. 3A and 3B are explanatory diagrams illustrating monitoring moving image displayed on monitor 7 illustrated in FIG. 1. FIG. 4 is an explanatory diagram explaining stay information generated by processing performed by PC 3. FIG. 5 is an explanatory diagram explaining an overview of the processing performed by PC 3.

As illustrated in FIGS. 3A and 3B, persons performing settlement at the cash register counter are reflected in the monitored moving image captured by camera 1, and those persons enter the cash register counter from the entrance side, that is, from the back side away from camera 1 and leave the counter from the exit side, that is, from the front side close to camera 1. Thus, lines are made around the cash register counter led by persons performing the settlement at the cash register counter, and thus, the area around the cash register counter is in a state of the persons staying. In addition, at the entrance side of the cash register counter, a flow of persons toward the cash register counter is made, and at the exit side of the cash register counter, a flow of the persons who finish the settlement at the cash register counter and move toward the entrance gate of the store is made.

In the present exemplary embodiment, the user designates a target area on a part of the focused area on the monitored moving image, and an enlarged image which is enlarged from the original image of the target area is displayed on the monitored moving image using a P in P method. That is, the enlarged image is superimposed and displayed on the monitored moving image as the sub-image.

FIG. 3A illustrates a case where the user focuses on the area where a person is staying and sets a target area on a part of the area where the person is staying. In this case, it is possible to observe in detail the state of the person in the target area by displaying the enlarged image which is enlarged from the original image of the target area as the sub-image. However, at this time, it is necessary to observe the state of the person in the entire area where the person is staying. Therefore, it is necessary to arrange the sub-image of sub-image at the position separated from the area where the person is staying. Therefore, in the present exemplary embodiment, the sub-image is arranged at the area having a low relevance to the target area and the staying state of the person, that is, at the area where the persons are flowing.

FIG. 3B illustrates a case where the user focuses on the area where persons are flowing and sets a target area on a part of the area where the person is flowing. In this case, it is possible to observe in detail the state of the person in the target area by displaying the enlarged image which is enlarged from the original image of the target area as the sub-image. However, at this time, it is necessary to observe the state of the person on the entire area where the person is flowing. Therefore, it is necessary to arrange the sub-image on the position separated from the area where the person is flowing. Therefore, in the present exemplary embodiment, the sub-image is arranged at the area having low relevance to the target area and the staying state of the person, that is, at the area where the persons are staying.

As described above, in the present exemplary embodiment, by arranging the sub-image at the area having a low relevance to the target area and the staying state of the person, it is possible to observe the area having a high relevance to the target area, that is, the entire area focused by the user without being obstructed by the sub-image. In addition, even in a case where the sub-image is arranged at the area having a low relevance to the target area, it is desired that the sub-image is arranged such that the persons are not hidden as visible as possible. Therefore, in the present exemplary embodiment, the sub-image is arranged at the area where there are less persons and at the area having a low relevance to the target area.

In addition, in the present exemplary embodiment, because the sub-image is arranged at the area having low relevance to the target area and the staying state of the person, the staying state of the person present on the monitored moving image is observed, and the staying state in the target area is determined based on stay information obtained as a result of the observation. Then, the arrangement position of the sub-image is determined by searching for the area having a low relevance to the target area based on the staying state in the target area.

Here, in the present exemplary embodiment, as illustrated in FIG. 4, stay information is acquired, which indicates the staying situation of the person for each of a plurality of cells C (observation area) which is made by dividing the monitored moving image in a grid pattern. In the present exemplary embodiment, a number-of-stays (in an example illustrated in FIG. 4, indicated in 10 steps of B1 to B10), that is, the number of persons staying in each cell C during a predetermined observation period and a time-of-stays for each cell C, that is, a time the person staying in each cell C during the predetermined observation period are acquired as the stay information for each cell C. Then, the staying state in the target area is determined based on the stay information (the number-of-stays and the time-of-stays) for each cell C, and in addition, the area having a low relevance to the target area is searched for.

In FIG. 4, in order to explain the stay information indicating the staying situation in the monitored moving image, a heat map image that visualizes the stay information is illustrated. However, in a case where the sub-image is superimposed on the monitored moving image, the heat map image is not displayed on the monitoring moving image. In addition, in FIG. 4, a heat map image indicating the number-of-stays for each cell C is illustrated. However, similarly, a heat map image indicating the time-of-stays for each cell C can be acquired.

In addition, in the present exemplary embodiment, as illustrated in FIG. 5, an average time-of-stays which is an average of the time-of-stays for each person in the target area is obtained, and it is determined which of the staying state and the non-staying state the target area is in based on the average time-of-stays in the target area. The determination of this staying state is performed by comparing the average time-of-stays with the predetermined threshold value.

On the other hand, when determining the arrangement position of the sub-image, a candidate area is set on the monitored moving image and the relevance between the candidate area and the target area with regard to the staying state is evaluated. At this time, the number-of-stays and the total time-of-stays which is the sum of the time-of-stays for each person in the candidate area are obtained, and the relevance between the candidate area and the target area is evaluated based on the number-of-stays and a total time-of-stays in the candidate area.

Here, first, the candidate area having a high number-of-stays, that is, the candidate area where large number of persons are present is excluded, and it is limited to the candidate area having a low number-of-stays, that is, candidate area where the number of persons is small. Then, the candidate area having a low relevance to the target area, that is, the candidate area which is in the staying state opposite to that of the target area is selected. Specifically, in a case where the target area is in the staying state, the candidate area having the low number-of-stays and short total time-of-stays is selected. In a case where the target area is in the non-staying state, the candidate area having a low number-of-stays and a large total time-of-stays is selected.

In the monitoring moving image illustrated in FIGS. 3A and 3B, the monitored moving image is displayed as a moving image. In addition, a display frame of the sub-image is always displayed, and the sub-image that is the enlarged image from the original image of the target area is displayed as the moving image. Usually, the moving image in the monitored moving image and the moving image in the sub-image are synchronized to be replayed. However, it is possible to delay the replaying timing of the moving image in the sub-image with respect to the moving image in the monitored moving image according to the preference of the user. In addition, a frame indicating the range of the target area is always displayed on the monitoring moving image. In addition, in the present exemplary embodiment, a plurality of target areas can be set on the monitored moving image, and an auxiliary line indicating a correspondence relationship between the target area and the sub-image is displayed in the monitoring moving image. The correspondence relationship may be indicated by changing the color of the frame of the target area and the color of the display frame of the sub-image. In addition, the correspondence relationship may be indicated by an arrow connecting the frame of the target area and the display frame of the sub-image.

In addition, in the present exemplary embodiment, the heat map image illustrated in FIG. 4 is not displayed in the monitoring moving image. However, the user can switch a mode to and from a display mode and a non-display mode. For example, when viewing the monitoring moving image for the purpose of monitoring, since the heat map image becomes an obstruction to the monitoring, the non-display mode may be selected. For other purposes of the monitoring, for example, for the purpose of analyzing the behavior of the customers, since the heat map image can be a reference for the analysis, the display mode may be selected. In addition, in the present exemplary embodiment, the user can designate the arrangement position of the sub-image, and at this time, the heat map image may be displayed as the reference for such a designation.

Figure 6:
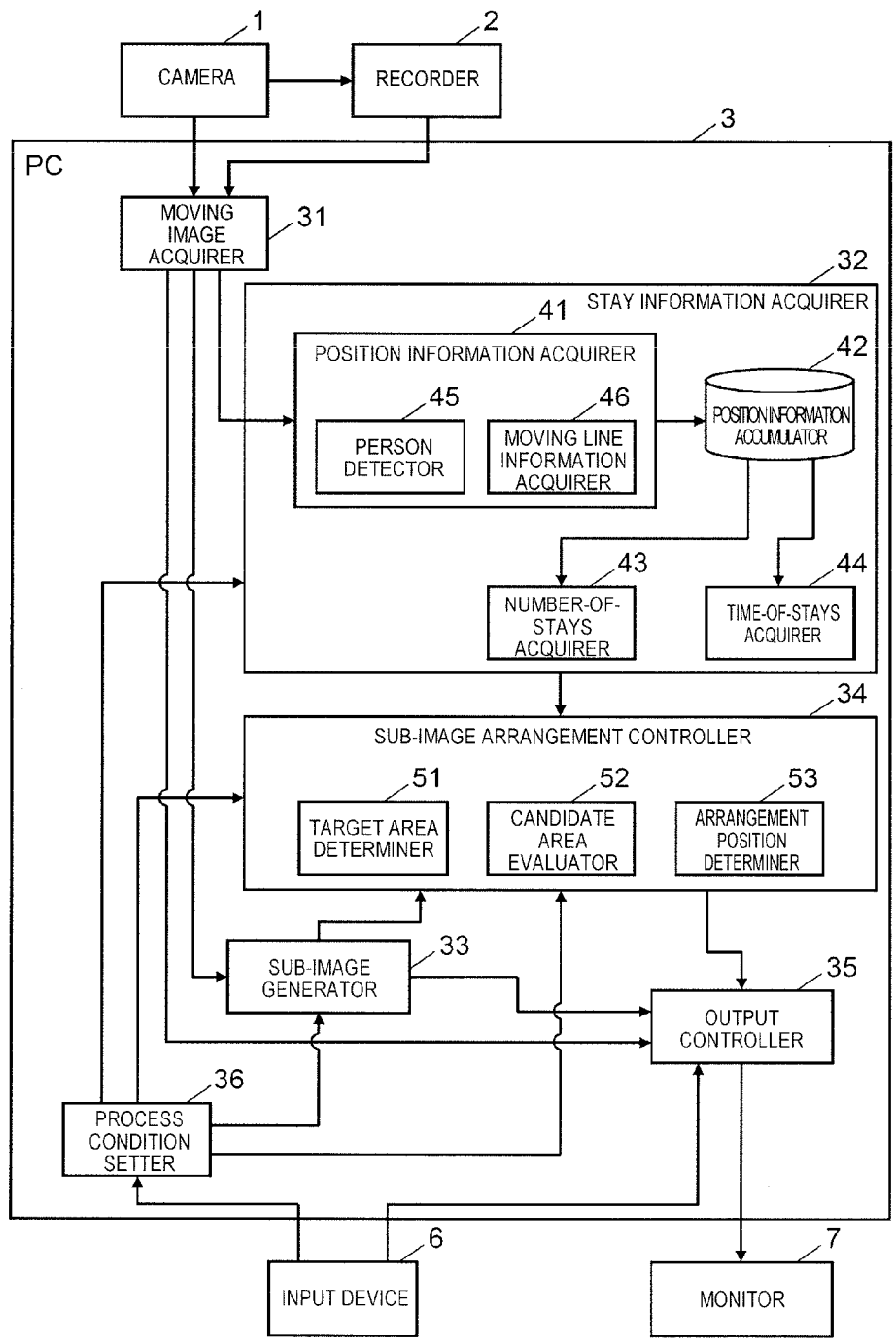
FIG. 6 is a functional block diagram illustrating a schematic configuration of PC 3.

Next, processing performed in PC 3 illustrated in FIG. 1 will be described. FIG. 6 is a functional block diagram illustrating a schematic configuration of PC 3.

PC 3 includes moving image acquirer 31, stay information acquirer 32, sub-image generator 33, sub-image arrangement controller 34, output controller 35, and process condition setter (target area setter) 36.

In moving image acquirer 31, a moving image in which inside of the store is captured by camera 1 is acquired from camera 1 or recorder 2. Here, in a case where a moving image of current time is displayed in real time, the moving image is acquired from camera 1, and in a case where a moving image of the past time is displayed, the moving image is acquired from recorder 2.

Stay information acquirer 32 observes the staying situation of the person appearing in the moving image acquired by moving image acquirer 31 and acquires the stay information (the time-of-stays and the number-of-stays) that indicates the staying situation of the person in each cell C (refer to FIG. 4). The stay information acquirer 32 includes position information acquirer 41, position information accumulator 42, number-of-stays acquirer 43, and time-of-stays acquirer 44.

Position information acquirer 41 detects a person from the moving image acquired by moving image acquirer 31 and acquires position information of each person, and includes person detector 45 and moving line information acquirer 46.

In person detector 45, processing that detects a person from the moving image (frame) acquired by moving image acquirer 31 is performed. A known image recognition technology may be used in the processing performed in person detector 45. In moving line information acquirer 46, processing that acquires a moving line (trajectory) of each person is performed based on the detection result in person detector 45. The information relating to the moving line of each person acquired by moving line information acquirer 46 is accumulated in position information accumulator 42 as position information of each person.

In position information acquirer 41, coordinates of a center point of the person is acquired and the moving line is generated in such a manner that the center points are connected. In addition, in the position information acquired by position information acquirer 41, time information relating to a capture time of the moving image from which the person is detected, a detection time of each of the acquired person, and the like is included.

In number-of-stays acquirer 43, temporal statistical processing is performed on the position information (moving line information) of each person accumulated in position information accumulator 42, and processing that acquires the number-of-stays (the number of staying persons) during a predetermined observation period is performed for each cell C. In this processing, the number-of-stays during the observation period is obtained by counting the number of moving lines of each person passing each cell C during the observation period.

In time-of-stays acquirer 44, temporal statistical processing is performed on the position information (moving line information) of each person accumulated in position information accumulator 42, and processing that acquires the time-of-stays (the total time-of-stays and the average time-of-stays) during a predetermined observation period is performed for each cell C. In this processing, firstly, the stay-time of each person (time of entering cell C and time of leaving cell C) of each person is acquired using the moving line of each person passing cell C during the observation period, and next, the time-of-stays of each person is acquired from the stay-time of each person, and then, the total time-of-stays during the observation period is acquired by adding the time-of-stays of each person. Furthermore, the average time-of-stays which is an average of the time-of-stays of each person is acquired by dividing the total time-of-stays by the number-of-stays.

In addition, in stay information acquirer 32, processing that generates the stay information (the time-of-stays and the number-of-stays) in the target area set by process condition setter 36 from the stay information of each cell C, is performed. In addition, in stay information acquirer 32, processing that generates the stay information in the candidate area set by sub-image arrangement controller 34 from the stay information of each cell C, is preformed. In the processing that generates the stay information items in the target area and the candidate area, for example, the stay information items in the target area and the candidate area can be obtained by, for example, respectively multiplying an occupancy rate of each cell C to the stay information of each cell C included in the target area and the candidate area. The stay information items in the target area and the candidate area may be generated from the position information (the moving line information) without generating the stay information of each cell C.

In sub-image generator 33, processing that cuts out an image region of the target area from the monitored moving image and generation of a sub-image from the cut-out original image, is performed. In the present exemplary embodiment, processing that enlarges the original image of the target area is performed based on a magnification factor or a size of the sub-image set by process condition setter 36. In a case where a magnification factor (enlargement rate) is set by process condition setter 36, the size of the sub-image is determined from the size of the original image of the target area and the magnification factor. In addition, in a case where the size of the sub-image is set by process condition setter 36, processing that enlarges the original image so as to be suitable for the size is performed.

Sub-image arrangement controller 34 controls the arrangement position of the sub-image on the monitored moving image based on the stay information acquired by stay information acquirer 32, and includes target area determiner 51, candidate area evaluator 52, and arrangement position determiner 53.

In target area determiner 51, processing that determines the staying state in the target area based on the stay information of the target area acquired by stay information acquirer 32 is performed. In the present exemplary embodiment, as described above, in stay information acquirer 32, the average time-of-stays in the target area, that is, the average time-of-stays which is the average of the time-of-stays of each person passing the target area, specifically, the value (T/F) that is obtained by dividing total time-of-stays T which is obtained by adding time-of-stays of each person by number-of-stays F is obtained. In target area determiner 51, the staying state in the target area is determined based on the average time-of-stays.

Here, in a case where the average time-of-stays is large, that is, in a case where the person is staying, it is determined that the target area is in the staying state. In a case where the average time-of-stays is short, that is, in a case where the person is flowing, it is determined that the target area is in the non-staying state. Specifically, comparing the average time-of-stays with a predetermined threshold value, in a case where the average time-of-stays is equal to or larger than the threshold value, it is determined that the target area is in the staying state, and in a case where the average time-of-stays shorter than the threshold value, it is determined that the target area is in the non-staying state.

In candidate area evaluator 52, processing that sequentially sets the candidate area on the monitored moving image, causes the stay information acquirer 32 to perform the processing that acquires the stay information of each candidate area, and evaluates the relevance to the staying state between each candidate area and the target area is performed based on the stay information of each candidate area. In the present exemplary embodiment, an evaluation value indicating the degree of relevance between each candidate area and the target area is calculated. This evaluation value is calculated by a preset calculation formula, and the value becomes large when the relevance to the target area and the candidate area becomes high. When the relevance to the target area becomes high, the evaluation value becomes large, and when the relevance to the target area becomes low, the evaluation value becomes small. In candidate area evaluator 52, the size of the sub-image is acquired from sub-image generator 33, and the size of the candidate area is set to be the same as the size of the sub-image.

In arrangement position determiner 53, processing that selects the best candidate area based on the result of evaluating each candidate area by candidate area evaluator 52 and determines the arrangement position of the sub-image is performed. In this processing, the candidate area is selected under a condition that the relevance to the target area the staying state is low. In the present exemplary embodiment, the evaluation value indicating the degree of the relevance between each candidate area and the target area is calculated by candidate area evaluator 52, and the candidate area is selected in arrangement position determiner 53 under the condition that the evaluation value is small. As will be appropriately described below, the candidate area can be selected considering a condition other than the evaluation value, and in a case where the condition other than the evaluation value is not considered, the candidate area of which the evaluation value is lowest is selected.

In the present exemplary embodiment, a mode of fixing the arrangement position of the sub-image to a predetermined position can be selected. In this case, sub-image arrangement controller 34 fixes the predetermined position as the arrangement position of the sub-image. In addition, in the present exemplary embodiment, a mode of not performing the evaluation of the relevance to the staying state can be selected. In this case, the best candidate area is selected based on only the number-of-stays in each candidate area. That is, the candidate area of which the number-of-stays is low is selected.

In output controller 35, processing that generates a monitoring moving image in which the sub-image generated by sub-image generator 33 based on the arrangement position of the sub-image determined by sub-image arrangement controller 34 is composed on the monitored moving image, and displaying the monitoring moving image on monitor 7 are performed. In this way, the monitoring moving image (refer to FIGS. 3A and 3B) is displayed on monitor 7. In addition, in output controller 35, processing that displays the target area input screen (refer to FIG. 7) and the sub-image setting screen (refer to FIGS. 8A, 8B, and 8C) on monitor 7 is performed.

In process condition setter 36, processing that sets the position of the target area on the monitored moving image is performed according to a user's operation input. In this processing, the target area input screen (refer to FIG. 7) on which the monitored moving image is displayed is displayed on monitor 7, the user inputs the position of the target area on the target area input screen, and then, position information of the target area is acquired. According to the position information of the target area set by process condition setter 36, processing that acquires stay information of the target area is performed by stay information acquirer 32. In addition, processing that cuts out the image region of the target area from the monitored moving image is performed by sub-image generator 33.

In addition, in process condition setter 36, processing that sets the process condition relating to the sub-image is performed according to the user's operation input. In this setting processing, the sub-image setting screen (refer to FIGS. 8A, 8B, and 8C) is displayed on monitor 7, the user is caused to input the process condition on the sub-image setting screen, and then, information relating to the process condition is acquired. The processing that generates the sub-image is performed by sub-image generator 33 according to the process condition set by process condition setter 36, or the processing that controls the arrangement position of the sub-image is performed by sub-image arrangement controller 34.

Figure 7:
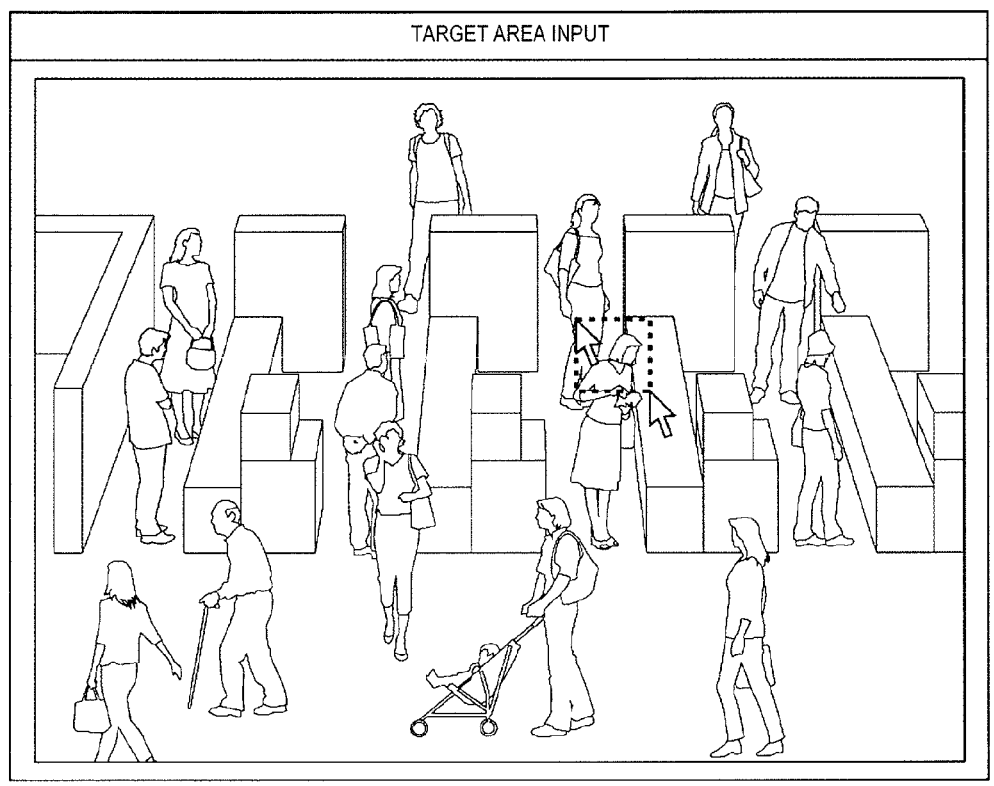
FIG. 7 is an explanatory diagram illustrating a target area input screen displayed on monitor 7.

Next, an operation by the user for designating the target area on the monitored moving image will be described. FIG. 7 is an explanatory diagram illustrating a target area input screen displayed on monitor 7 illustrated in FIG. 6.

In the present exemplary embodiment, in process condition setter 36, the processing that sets the target area on the monitored moving image is performed according to the user's operation input, and at this time, the target area input screen illustrated in FIG. 7 is displayed on monitor 7. This target area input screen is a screen in which the user designates the position of the target area on the monitored moving image, and thus, the monitored moving image is displayed on the target area input screen. The user performs an operation for designating one vertex and another vertex in the diagonal direction of the rectangular-shaped target area on the monitored moving image using input device 6 such as a mouse. For example, an operation of drag-and-dtop is performed, in which the mouse clicks one vertex, dragging and dropping it to the other vertex. By this operation, the position of the target area can be input.

Figure 8A:
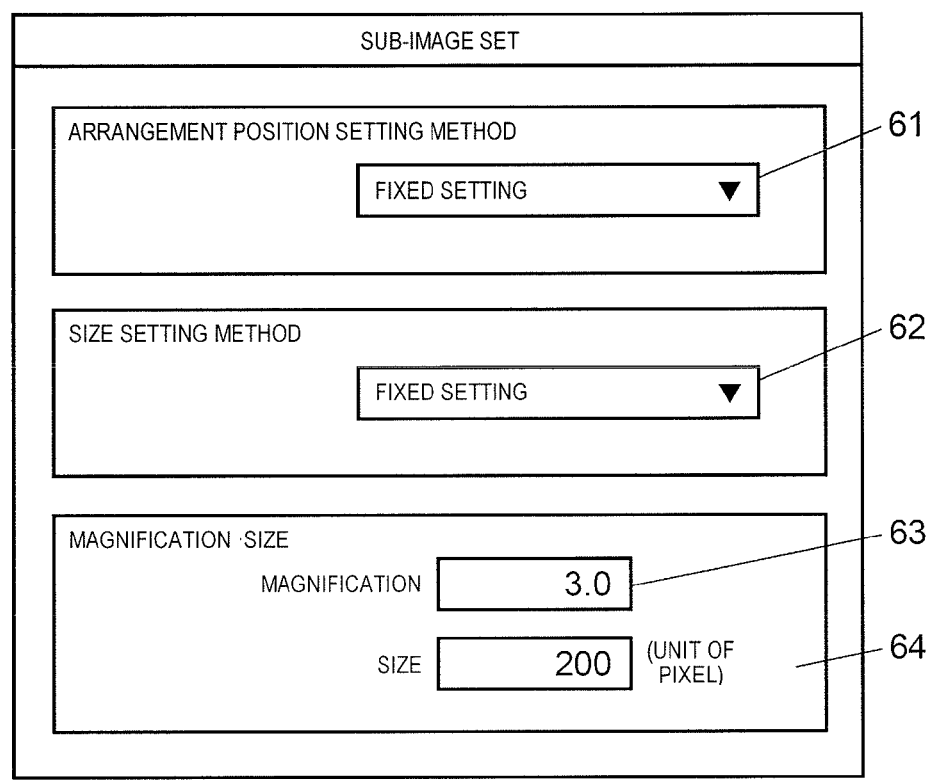
FIG. 8A is an explanatory diagram illustrating a sub-image setting screen displayed on monitor 7.
Figure 8B:
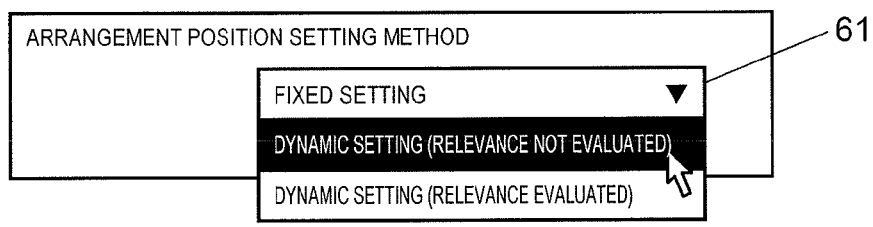
FIG. 8B is an explanatory diagram illustrating a sub-image setting screen displayed on monitor 7.
Figure 8C:
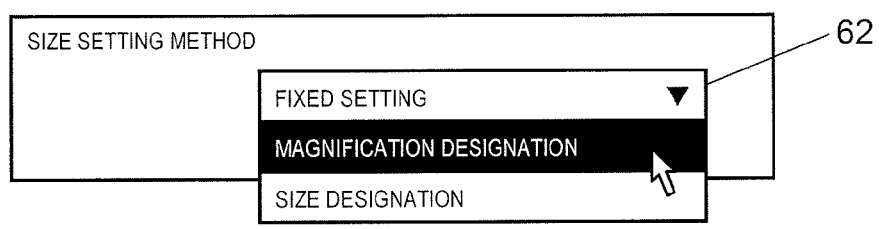
FIG. 8C is an explanatory diagram illustrating a sub-image setting screen displayed on monitor 7.

Next, the processing that sets various conditions relating to the sub-image will be described. FIGS. 8A, 8B, and 8C are explanatory diagrams illustrating a sub-image setting screen displayed on monitor 7 illustrated in FIG. 6.

In the present exemplary embodiment, in process condition setter 36, the processing that sets various conditions relating to the sub-image is performed according to the user's operation input, and at this time, the sub-image setting screen illustrated in FIGS. 8A, 8B, and 8C is displayed on monitor 7. This sub-image setting screen is a screen in which the user designates various conditions relating to the sub-image, and as illustrated in FIG. 8A, arrangement position setting mode selector 61, size setting mode selector 62, magnification designator 63, and size designator 64 are provided in the sub-image setting screen.

In arrangement position setting mode selector 61, the user selects a setting mode relating to the arrangement position of the sub-image. In arrangement position setting mode selector 61, as illustrated in FIG. 8B, the setting mode can be selected as any one of a fixed setting, a dynamic setting (relevance evaluated), and a dynamic setting (relevance not evaluated) using a pull down menu. In the fixed setting, the position determined in advance as an initial setting is set to be the arrangement position of the sub-image as it is. In the dynamic setting (relevance not evaluated), the arrangement position of the sub-image is determined under only the condition that the number-of-stays is small. In the dynamic setting (relevance evaluated), the arrangement position of the sub-image is determined according to the relevance evaluation based on the staying state as described above.

A mode in which the user arbitrarily designates the arrangement position of the sub-image may be provided in arrangement position setting mode selector 61.

In size setting mode selector 62, the user selects a setting mode relating to the size of the sub-image. In size setting mode selector 62, as illustrated in FIG. 8C, the setting mode can be selected as any one of a fixed setting, a magnification designation, and a size designation using a pull down menu. In the fixed setting, the size (or the magnification) set in advance is set to be the size (the magnification) of the sub-image. In the magnification designation, the size of the enlarged image which is enlarged from the original image by a magnification designated by magnification designator 63 is set to be the size of the sub-image. In the size designation, the size designated by size designator 64 is set to be the size of the sub-image.

In magnification designator 63, the user designates the magnification (enlargement rate) of the sub-image. In size designator 64, the user designates the size of the sub-image. When the magnification designation is selected in size setting mode selector 62, the magnification can be designated in magnification designator 63. When the size designation is selected in size setting mode selector 62, the size can be designated in size designator 64. In the example illustrated in FIG. 8A, since the user can input numerical numbers in magnification designator 63 and size designator 64, arbitrary size and magnification can be designated by the user.

In addition, in the example illustrated in FIG. 8A, the shape of the sub-image is a square, and in size designator 64, a length of one side of the square is designated as a pixel unit. However, the shape of the sub-image may be a rectangular shape having an arbitrary aspect ratio, and in size designator 64, the lengths of the vertical and horizontal sides of the sub-image may be respectively designated. In this case, the sub-image setting screen may be displayed after designating the target area on the target area setting screen (refer to FIG. 7). In addition, after designating the lengths of the vertical and horizontal sides of the sub-image on the sub-image setting screen, the target area setting screen may be configured such that the target area can be designated in an aspect ratio corresponding to the designated lengths of the vertical and horizontal sides.

As described above, in the present exemplary embodiment, the user can freely select the setting mode relating to the arrangement position of the sub-image and the setting mode relating to the size of the sub-image. In addition, since the user can freely designate the magnification (enlargement rate) and the size of the sub-image, it is possible to display the appropriate sub-image in accordance with the situation in the monitoring area, a content of the monitoring operation, or the like. Therefore, it is possible to achieve the efficiency of the monitoring operation.

Figure 9:
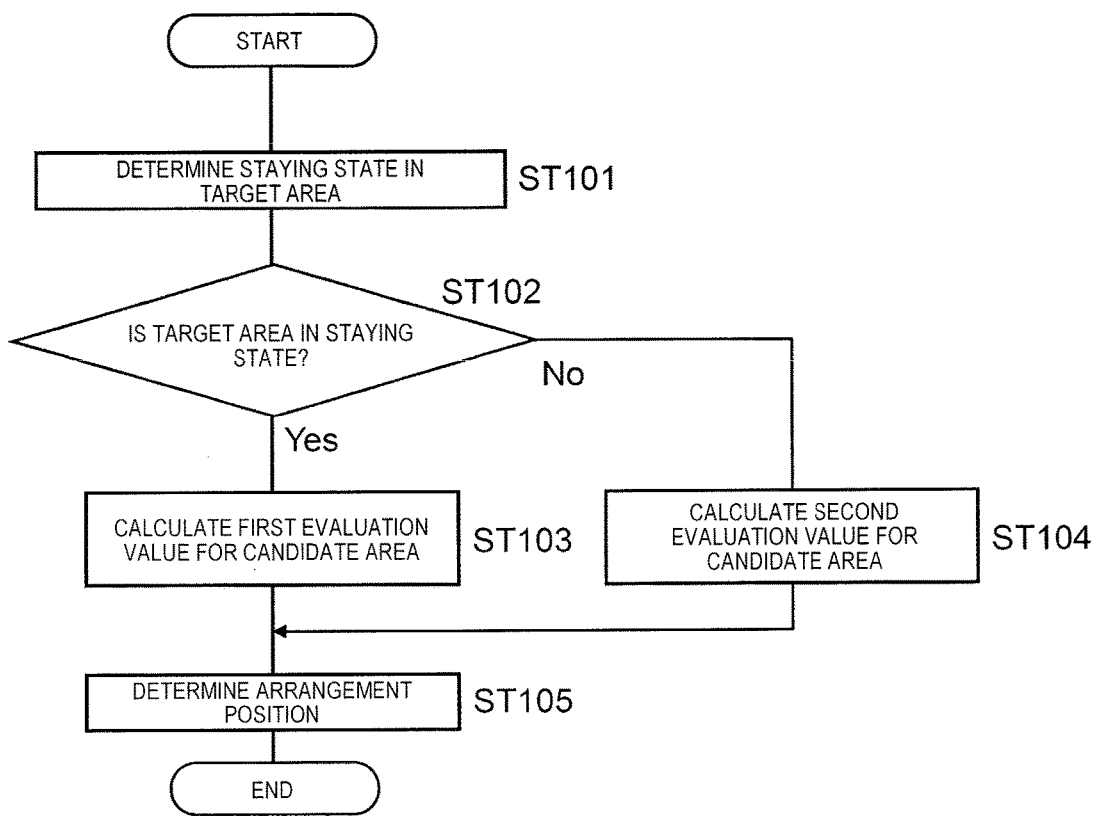
FIG. 9 is a flowchart illustrating a processing procedure performed by sub-image arrangement controller 34.

Next, processing performed by sub-image arrangement controller 34 illustrated in FIG. 6 will be described. FIG. 9 is a flowchart illustrating a processing procedure performed by sub-image arrangement controller 34.

In the present exemplary embodiment, the staying state in the target area is determined by sub-image arrangement controller 34, the relevance of the staying state between the candidate area and the target area is evaluated according to the determination result, the best candidate area is selected based on the evaluation result, and then, the arrangement position of the sub-image is determined.

Specifically, first, staying state in the target area is determined by target area determiner 51 in sub-image arrangement controller 34 based on the average time-of-stays (ST101). Next, in a case where the target area is in the staying state (Yes in ST101), a first evaluation value for the candidate area is calculated by candidate area evaluator 52 (ST103). On the other hand, in a case where the target area is not in the staying state (No in ST102), a second evaluation value for the candidate area is calculated (ST104).

Then, the best candidate area is selected based on the first evaluation value or the second evaluation value and the arrangement position of the sub-image is determined by arrangement position determiner 53 (ST105). At this time, the candidate area of which the first evaluation value or the second evaluation value is the smallest, and then, the position of the candidate area is the arrangement position of the sub-image.

Figure 10:
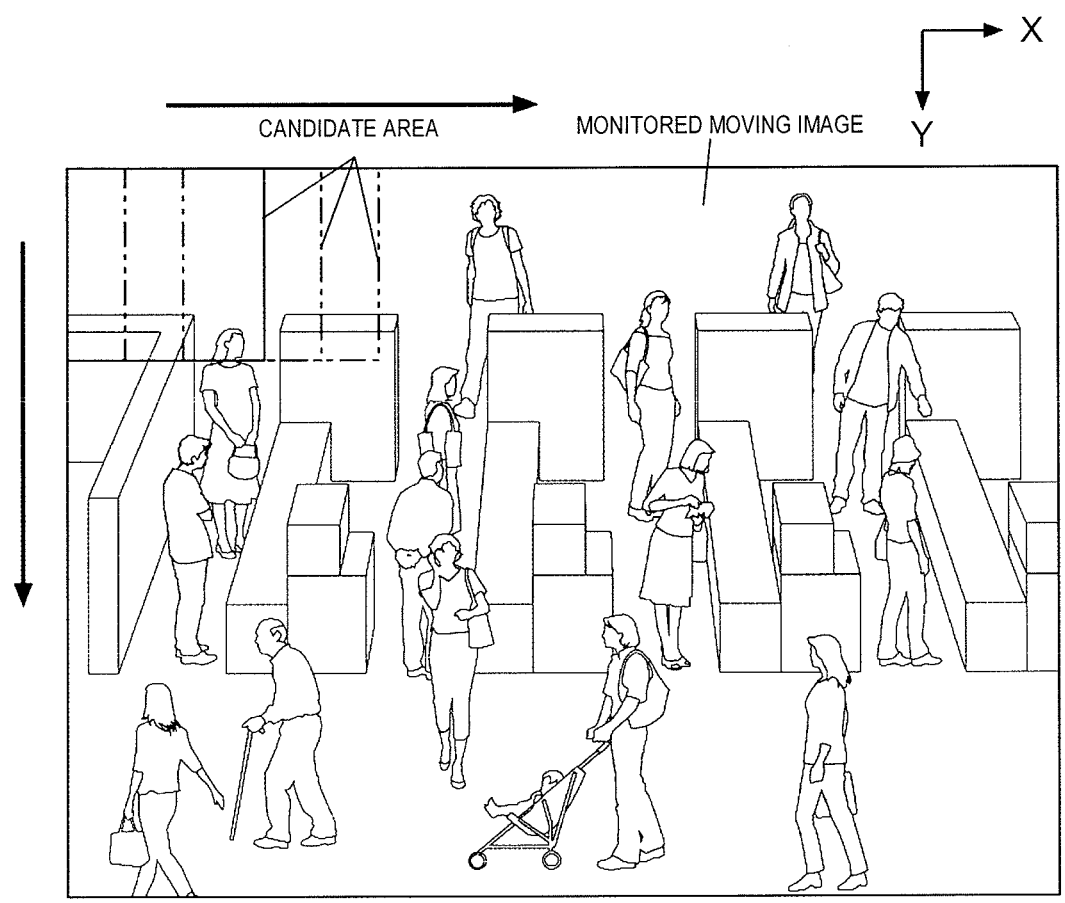
FIG. 10 is an explanatory diagram explaining candidate area setting processing performed by candidate area evaluator 52.

Next, the candidate area setting processing performed by candidate area evaluator 52 in sub-image arrangement controller 34 illustrated in FIG. 6 will be described. FIG. 10 is an explanatory diagram explaining candidate area setting processing performed by candidate area evaluator 52.

In the present exemplary embodiment, in candidate area evaluator 52 in sub-image arrangement controller 34, candidate areas are sequentially set on the monitored moving image with the size same as the size of sub-image set by sub-image generator 33, and the evaluation value indicating the degree of relevance to the staying state between each candidate area and the target area is calculated. At this time, the candidate areas are sequentially set on the monitored moving image while separating a constant interval from a predetermined starting position.

Specifically, the candidate areas are sequentially set on the monitored moving image while being separated by a constant interval in the X-direction (lateral direction) and the Y-direction (vertical direction). In the example illustrated in FIG. 10, with a left upper end of the monitored moving image as a start point, the candidate areas are sequentially set while being separated by a constant interval in the X-direction (lateral direction) from the start point, and next, when the candidate area arrives at the right end of the candidate area, the candidate areas are sequentially set in the X-direction (lateral direction) while being separated by a constant interval in the Y-direction (vertical direction). The candidate area can be set on the entire monitored moving image by repeating the above-described processing.

Next, the evaluation value calculation processing performed by candidate area evaluator 52 in sub-image arrangement controller 34 illustrated in FIG. 6 will be described.

In the present exemplary embodiment, in candidate area evaluator 52 in sub-image arrangement controller 34, the evaluation value indicating the degree of the relevance to the staying state of the person between each candidate area and the target area is calculated. The evaluation values are different from each other according to the staying state in the target area. In a case where the target area is in the staying state, the first evaluation value is calculated, and in a case where target area is in the non-staying state, the second evaluation value is calculated.

First evaluation value S1 in the case where the target area is in the staying state is, as expressed in following formula, a sum of values obtained by multiplying number-of-stays F and total time-of-stays T by predetermined weight coefficients Wa1 and Wb1 respectively.

$$S1 = F \times Wa1 + T \times Wb1$$

Here, in a case where both the values of number-of-stays F and total time-of-stays T are small, first evaluation value S1 becomes small.

In addition, second evaluation value S2 in the case where the target area is in the non-staying state is, as expressed in following formula, a sum of values obtained by multiplying number-of-stays F and the inverse number of total time-of-stays T by predetermined weight coefficients Wa2 and Wb2 respectively.

$$S2 = F \times Wa2 + 1/T \times Wb2$$

Here, in a case where the value of number-of-stays F is small and the value of total time-of-stays T is large, second evaluation value S2 becomes small.

In this way, when the first evaluation value or the second evaluation value is calculated by candidate area evaluator 52, next, the best candidate area is selected by arrangement position determiner 53 based on the first evaluation value or the second evaluation value. Then, the processing that determines the arrangement position of the sub-image is performed based on the position of the candidate area.

In the arrangement position determination processing, the candidate area of which the first evaluation value or the second evaluation value is smallest is selected. In this way, in a case where the target area is in the staying state, the candidate area of which the values of both the number-of-stays and the total time-of-stays are small is selected. In a case where the target area is in the non-staying state, the candidate area of which the value of the number-of-stays is small and the value of the total time-of-stays is large is selected.

Weight coefficients Wa1, Wb1, Wa2, and Wb2 used in the evaluation value calculation formula may be constants. However, the user can appropriately change the coefficients in such a manner that appropriate evaluation results can be obtained.

In addition, in the arrangement position determination processing, in some case, a plurality of candidate areas of which the first evaluation value or the second evaluation value are the same may be found. In this case, the candidate areas may be narrowed to one based on a predetermined condition. However, by displaying the plurality of candidate areas of which the first evaluation value or the second evaluation value are the same on the screen, the user may select one candidate area.

In the present exemplary embodiment, the candidate area is set subject to the entirety of the monitored moving image. However, in this case, the arrangement position of the sub-image is determined at a position largely separated from the target area, the target area and the corresponding sub-image are largely separated, and thus, it takes time for the user to find out the sub-image corresponding to the target area some times. Therefore, it is preferable that the arrangement position of the sub-image is determined at the position comparatively near the target area. In this way, it is possible to reduce the movement of the user's eyes and improve the efficiency of the monitoring operation.

Here, in determining the arrangement position of the sub-image at the position comparatively near the target area, when setting the candidate areas, the range of setting the candidate areas may be limited to an area separated by equal to or less than a predetermined distance from the target area. In addition, among the candidate areas of which the evaluation value based on the stay information is small, the candidate area of which a distance from the target area is short may be selected.

In addition, the calculation formula for calculating the evaluation value may be set in such a manner that the distance from the target area is reflected in the evaluation value of the candidate area. In this case, in a case where the distance from the target area is large, the calculation formula for calculating the evaluation value may be set such that the evaluation value becomes large. For example, a term which is proportional to the distance from the target area to the candidate area may be added to the calculation formula for calculating the evaluation value. In this way, if the distance from the target area is large, the evaluation value becomes large. Since the candidate area of which the evaluation value is small is selected, the candidate area of which the distance from the target area is short is selected.

As described above, in the present exemplary embodiment, in process condition setter (target area setter) 36, the target area is set on the monitored moving image according to the user's operation input, in stay information acquirer 32, the staying situation of the person appearing in the monitored moving image is observed and the stay information indicating the staying situation of the person is acquired, in sub-image generator 33, the sub-image is generated, in sub-image arrangement controller 34, the arrangement position of the sub-image on the monitored moving image is controlled based on the stay information acquired by stay information acquirer 32, in output controller 35, the monitoring moving image in which the sub-image is composed on the monitored moving image generated based on the arrangement position of the sub-image determined by sub-image arrangement controller 34, and then, the monitoring moving image is output to the display device. In this way, since the arrangement position of the sub-image on the monitored moving image is controlled based on the staying situation of the person, it is possible to arrange the sub-image at the appropriate position on the monitored moving image. Therefore, it is possible to efficiently perform the monitoring operation without the monitoring operation being hindered by the sub-image.

In addition, in the present exemplary embodiment, the stay information includes the information relating to the number-of-stays which is the number of persons staying in the observation area set on the monitored moving image and the time-of-stays which is the time during which the person stays in the observation area. Therefore, since the arrangement position of the sub-image is controlled based on the number-of-stays and the time-of-stays, it is possible to arrange the sub-image at the appropriate position.

In addition, in the present exemplary embodiment, in sub-image arrangement controller 34, the arrangement position of the sub-image is determined under the condition that the relevance to the target area relating to the staying state of the person is low based on the stay information. Therefore, the sub-image is arranged in the area having low relevance to the target area and the area having high relevance to the target area is not hidden by the sub-image. Therefore, it is possible to prevent the monitoring operation from being hindered.

In addition, in the present exemplary embodiment, in sub-image arrangement controller 34, it is determined which of the staying state and the non-staying state the target area is in based on the stay information, in a case where it is determined that the target area is in the staying state, the arrangement position of the sub-image is determined under the condition that the values of both the number-of-stays and the time-of-stays become small, and in a case where it is determined that the target area is in the non-staying state, the arrangement position of the sub-image is determined under the condition that the value of the number-of-stays becomes small and the value of the time-of-stays becomes large. In this way, since the sub-image is arranged as the area where the number of persons is small, it is possible to completely prevent the persons from being hidden by the sub-image. Then, in a case where the user focuses on the area where the persons are staying and a part of the area where the person is staying is designated as the target area, the target area is in the staying state. In a case where the sub-image is arranged at the area where the persons are flowing or the user focuses on the area where the persons are flowing and a part of the area where the persons are flowing is designated as the target area, the target area is in the non-staying state, and thus, the sub-image is arranged at the area where the person is staying. Therefore, the area focused by the user is not hidden by the sub-image, and thus, it is possible to prevent the monitoring operation from being hindered by the sub-image.

In addition, in the present exemplary embodiment, sub-image arrangement controller 34, with regard to a plurality of candidate area which is the candidate for the arrangement position of the sub-image, the evaluation value indicating the degree of relevance to the target area is acquired based on the stay information, the best candidate area is selected under the condition that the evaluation value is small, and then, the arrangement position of the sub-image is determined based on the candidate area. Therefore, the best candidate area can be simply and accurately searched for, and thus, it is possible to efficiently determine the arrangement position of the sub-image with a high accuracy.

In addition, in the present exemplary embodiment, in sub-image generator 33, the enlarged image which is enlarged from the original image of the target area is generated as the sub-image, and the enlarged image which is enlarged from the original image of the target area is superimposed and displayed on the monitored moving image as the sub-image. Therefore, it is possible to observe in detail the state of the person in the focused area.

Second Exemplary Embodiment

Figure 11:
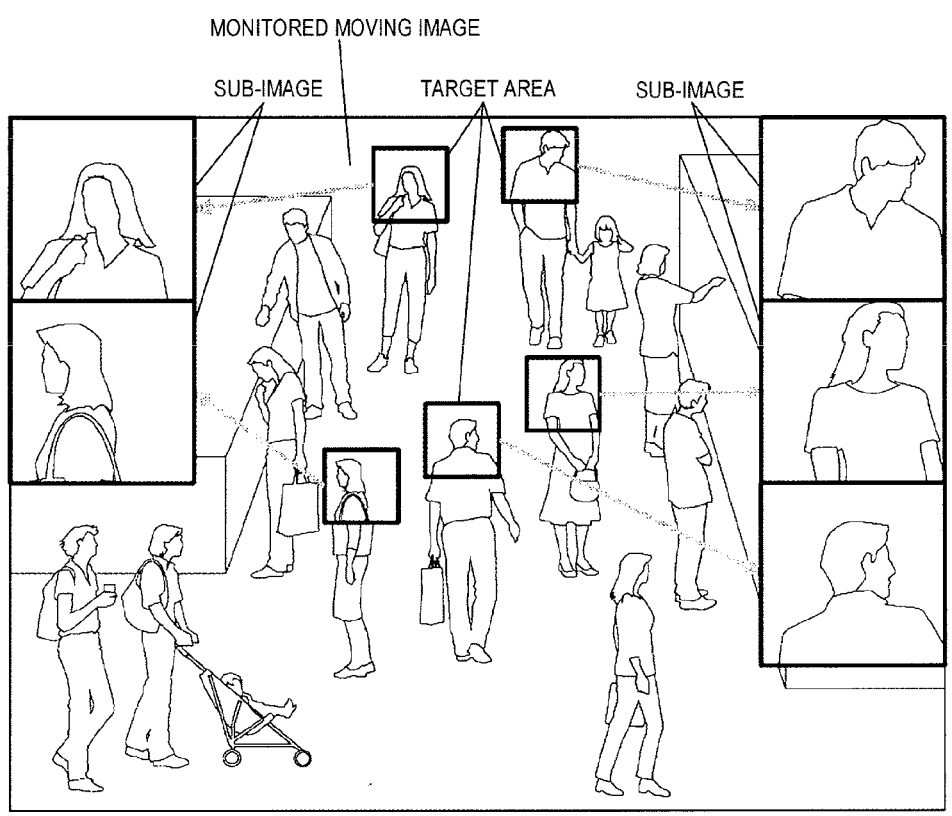
FIG. 11 is an explanatory diagram illustrating a monitoring moving image displayed on monitor 7 in a second exemplary embodiment.

Next, a second exemplary embodiment will be described. Points that are not particularly described here are similar to those in the first exemplary embodiment. FIG. 11 is an explanatory diagram illustrating a monitoring moving image displayed on monitor 7 in the second exemplary embodiment.

In the first exemplary embodiment, sub-image arrangement controller 34, the arrangement position of the sub-image is determined based on the stay information (the time-of-stays and the number-of-stays). However, in the second exemplary embodiment, the arrangement position of the sub-image is determined based on a face direction of the person appearing in the original image of the target area in addition to the stay information. Particularly here, the sub-image is arranged in a direction which roughly matches the face direction of the person appearing in the original image of the target area.

A known image recognition technology may be used for the processing that detects the face direction of the person performed by sub-image arrangement controller 34. In addition, in the example illustrated in FIG. 11, a plurality of target areas is set on the monitored moving image, and thus, arrows indicating the correspondence relationship between the target area and the sub-image are illustrated.

In the second exemplary embodiment, in sub-image arrangement controller 34, the best candidate area is selected based on the face direction of the person appearing in the original image of the target area in addition to the stay information. At this time, similar to the first exemplary embodiment, the best candidate area is selected based on the evaluation value. In this case, in a case where the candidate area positions in the direction matching the face direction of the person, the calculation formula for calculating the evaluation value may be set such that the evaluation value becomes small. For example, a term which is proportional to an angle made by the direction of the candidate area with respect to the target area and the face direction of the person may be added in the calculation formula for calculating the evaluation value. In this way, if the difference between the direction of the candidate area with respect to the target area and the face direction of the person becomes large, the evaluation value becomes large. Since the candidate area of which the evaluation value is small is selected, the candidate area that positions in the direction roughly matching the face direction of the person is selected.

In addition, a range of setting the candidate area may be limited based on the face direction of the person appearing in the original image of the target area. In addition, the candidate area that positions in the direction substantially matches the face direction of the person may be selected among the candidate areas of which the evaluation values are small after obtaining the evaluation values in a procedure similar to that in the first exemplary embodiment.

A situation may be considered, in which the face direction of the person appearing in the original image of the target area frequently changes. In this case, if the position of the sub-image frequently changes, the monitored moving image is in a situation difficult to see. The difficulty in seeing the monitored moving image can be improved by making a time to determine the face direction of next person be large. In a case where a plurality of persons is present in the target area, the face direction of the persons in the entire target area may be determined based on the ratio of the number of persons having different face directions.

As described above, in the present exemplary embodiment, in sub-image arrangement controller 34, the face direction of the person appearing in the original image of the target area is detected, and the arrangement position of the sub-image is determined based on the detection result. Therefore, the sub-image corresponding to the target area can be found quickly by the user seeing the face direction of the person appearing in the original image of the target area on the monitoring moving image. Therefore, it is possible to further improve the efficiency of the monitoring operation.

In addition, in the example illustrated in FIG. 11, the sub-image is arranged near the right and left end of the monitored moving image. If the sub-image is arranged in this way, it is possible to intuitively grasp how many persons are present and which direction they are facing, and thus, it is possible to achieve the improvement of the efficiency of the monitoring operation.

Third Exemplary Embodiment

Figure 12:
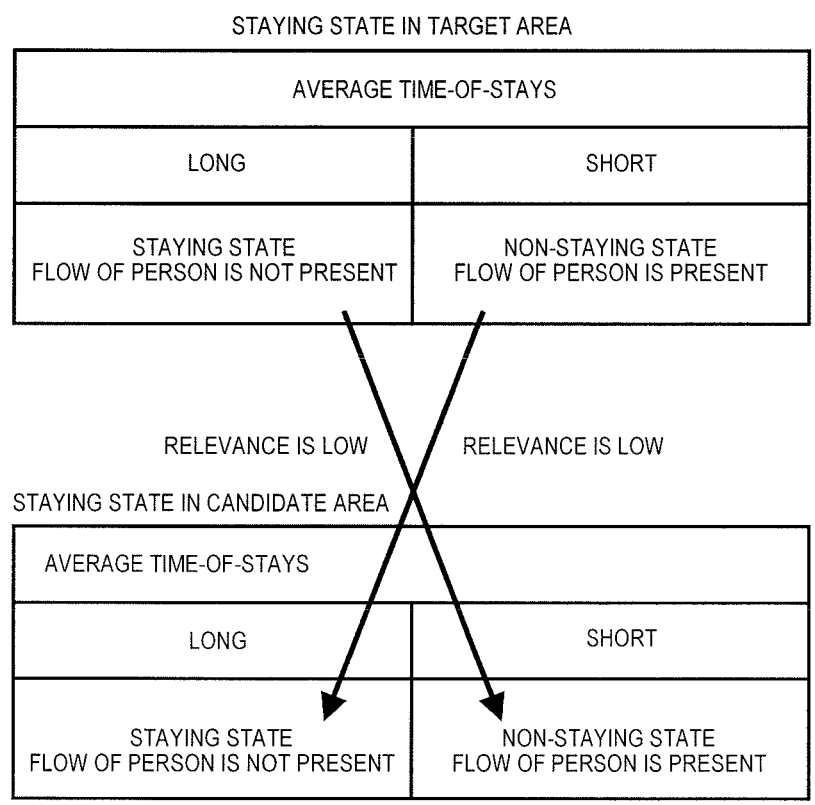
FIG. 12 is an explanatory diagram explaining an overview of processing performed by PC 3 in a third exemplary embodiment.

Next, a third exemplary embodiment will be described. Points that are not particularly described here are similar to those in the first exemplary embodiment. FIG. 12 is an explanatory diagram explaining an overview of processing performed by PC 3 in the third exemplary embodiment.

In the first exemplary embodiment, as illustrated in FIG. 5, the determination of the staying state in the target area is performed using the average time-of-stays which is the average value of the time-of-stays of each person, that is, using a value obtained by dividing the total time-of-stays obtained by adding the time-of-stays of each person by the number-of-stays, and the evaluation of the relevance when determining the arrangement position of the sub-image is performed using the number-of-stays and the total time-of-stays. However, in the third exemplary embodiment, the determination of the staying state in the target area is performed using the average time-of-stays similar to the first exemplary embodiment, but the evaluation of the relevance for determining the arrangement position of the sub-image is also performed using the average time-of-stays.

That is, in a case where the target area is in the staying state, that is, in a case where the average time-of-stays in the target area is equal to or larger than the predetermined threshold value, the candidate area of which the average time-of-stays is the shortest is selected. On the other hand, target area is in the non-staying state, that is, in a case where the average time-of-stays in the target area is shorter than the predetermined threshold value, the candidate area of which the average time-of-stays is the largest is selected.

As described above, if the evaluation of the relevance when determining the arrangement position of the sub-image is performed using the average time-of-stays, since the number-of-stays is not taken into consideration, there may a case where the sub-image is arranged in the area congested by the persons, but since the sub-image is arranged in the area having low relevance, there is no major problem in the monitoring operation.

Fourth Exemplary Embodiment

Next, a fourth exemplary embodiment will be described. Points that are not particularly described here are similar to those in the first exemplary embodiment.

In the first exemplary embodiment, the arrangement position of the sub-image is determined based on the stay information. However, in the fourth exemplary embodiment, the arrangement position of the sub-image is determined based on the moving direction of a person.

In a case where the user focuses on the area where the persons are flowing and a part of the area where the persons are flowing is set as the target area, an area where the person is moving in the direction substantially matches the moving direction of the person in the target area is present in the flow of the same person as the person in the target area. If the sub-image is arranged in this area, the entire area focused by the user cannot be observed. Therefore, it is necessary to arrange the sub-image in the area excluding the area described above.

Here, in the first exemplary embodiment, since the sub-image is arranged in the area where the person is not flowing by searching for the candidate area based on the stay information, it is possible to observe the state of the person in the entire area where the person is flowing without being hindered by the sub-image. On the other hand, in the fourth exemplary embodiment, it is possible to arrange the sub-image in the area which is not present in the flow of the same person as the person in the target area by searching for the candidate area based on the moving direction of the person.

In the fourth exemplary embodiment, the moving direction of each person is detected based on the moving line of each person, statistic processing such as averaging is performed on the moving direction of each person passing each cell C, and then, the moving direction in the unit of cell C is obtained. Next, the moving direction in the target area is obtained based on the moving direction in the unit of cell C, or the moving direction in the candidate area is obtained. Then, the candidate area in which the moving direction substantially matches the moving direction in the target area, that is, the candidate area that is present in the downstream side of the flow of the person in the target area, and the candidate area in which the moving direction is substantially reverse direction to the moving direction in the target area, that is, the candidate area that is present in the upstream side of the flow of the person in the target area, may be excluded from the selection target.

In addition, the calculation formula for calculating the evaluation value may be set in such a manner that the moving direction of the person is reflected in the evaluation value of the candidate area. In this case, in a case where the moving direction substantially matches the moving direction in the target area or the moving direction is substantially the reverse direction of the moving direction in the target area, the calculation formula for calculating the evaluation value may be set in such a manner that the evaluation value becomes small. For example, a term that is inversely proportional to the angle (if the angle exceeds 90°, supplementary angle thereof) made by the moving direction in the target area and the moving direction in the candidate area is added in the calculation formula for calculating the evaluation value. In this way, in a case where the moving direction in the target area substantially matches the moving direction in the candidate area or the moving direction in the target area is substantially the reverse direction of the moving direction in the candidate area, the evaluation value becomes large. Since the candidate area of which the evaluation value is small is selected, the candidate area which is not present in the flow of the same person as the person in the target area is selected.

In addition, when setting the candidate area, the area which is installed on the position in the direction that substantially matches the moving direction in the target area or in substantially reverse direction may be excluded from the range of setting the candidate area.

As described above, in the fourth exemplary embodiment, the best candidate area is selected based on the moving direction of the person. However, this processing may be performed in a case where the appropriate candidate area cannot be found by searching for the candidate area based on the stay information. In addition, it is possible to search for the candidate area based on only the moving direction of the person without considering the stay information.

Fifth Exemplary Embodiment

Figure 13:
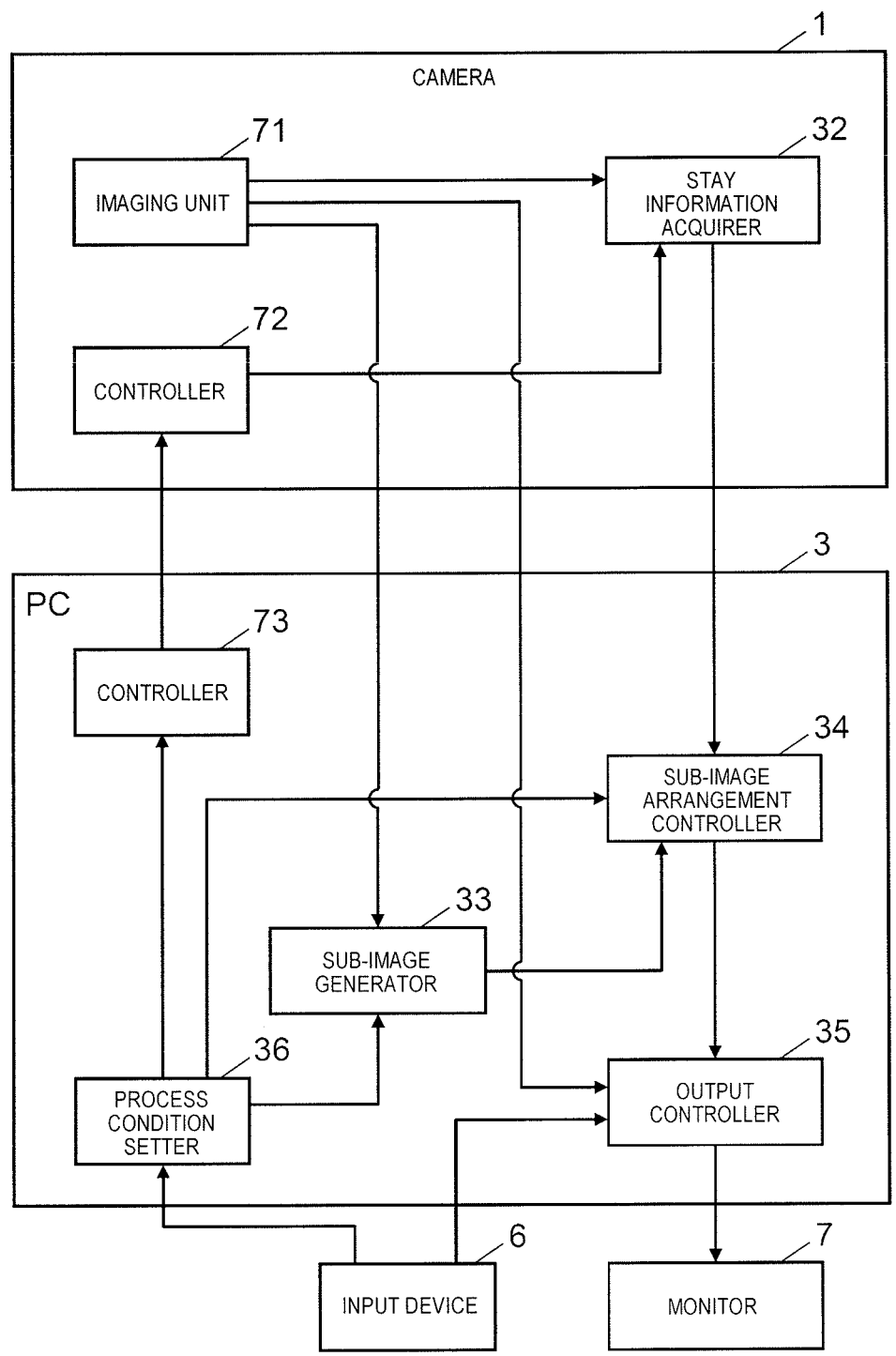
FIG. 13 is a functional block diagram illustrating a schematic configuration of camera 1 and PC 3 in the monitoring system in a fifth exemplary embodiment.

Next, a fifth exemplary embodiment will be described. Points that are not particularly described here are similar to those in the first exemplary embodiment. FIG. 13 is a functional block diagram illustrating a schematic configuration of camera 1 and PC 3 in the monitoring system in the fifth exemplary embodiment.

In the fifth exemplary embodiment, stay information acquirer 32 provided in PC 3 in the first exemplary embodiment is provided in camera 1. In camera 1, imaging unit 71 that includes an imaging element and an optical element is provided, and a moving image output from imaging unit 71 is input to stay information acquirer 32. On the other hand, in PC 3, sub-image generator 33, sub-image arrangement controller 34, output controller 35, and process condition setter 36 are provided.

In each part of camera 1 and PC 3, processing similar to that in the first exemplary embodiment is performed, and particularly in the fifth exemplary embodiment, information set by process condition setter 36, that is, information relating to the target area or the like is transmitted to controller 72 in camera 1 from controller 73 in PC 3, and predetermined processing is performed by stay information acquirer 32 based on this information. On camera 1 side, the information relating to the target area or the like is input and the predetermined processing is performed by stay information acquirer 32. However, the stay information from the stay information acquirer 32 is input to PC 3 and then, the predetermined processing may be performed in PC 3 side with reference to the information relating to the target area or the like.

As described above, specific exemplary embodiments of the present invention are described. However, these exemplary embodiments are merely examples and the present invention is not limited by these exemplary embodiments. In addition, each configuration element of the monitoring device, the monitoring system and the monitoring method according to the present invention illustrated in above-described exemplary embodiments are not necessarily required, and can be appropriately selected to be used without at least departing from the scope of the present invention.

For example, in the exemplary embodiment described above, the description is made with an example of a retail store such as a supermarket. However, the present invention is not limited to such a retail store, but can be applied to a store having a different business pattern from that of the retail store such as a restaurant or a bank. Furthermore, the present invention can be widely applied to a monitoring area other than a store, particularly a place where a situation occurs in which an area in which a person is staying in the monitoring area and an area in which a person is flowing are present in a mixed manner.

In addition, in the exemplary embodiment described above, the description is made with an example in which moving object which is a monitoring target is a person. However, the monitoring target may be a moving object other than the person, for example, a vehicle, a bicycle, or the like.

In addition, in the exemplary embodiment described above, as illustrated in FIG. 4, the stay information indicating the staying situation of a person is acquired for each of a plurality of cells C (divided region) which is made by dividing the monitored moving image in a grid pattern. However, the configuration is not limited to the division in a grid pattern, but the monitored moving image may be divided by appropriate division lines according to the situation in the monitoring area. In addition, the number of divisions of the monitored moving image may be appropriately set, and furthermore, the size of the divided region is not limited to be set as uniform, but may be set as an appropriate size according to the situation in the monitoring area.

In addition, in the exemplary embodiment described above, the enlarged image which is enlarged from the original image of the target area is superimposed on the monitored moving image as the sub-image so as to be displayed. However, the sub-image is not limited to the enlarged image, an original image of the target area of which the imaging time is different from that of the monitored moving image displayed on the monitoring moving image may be superimposed on the monitored moving image in the same size as the sub-image so as to be displayed.

In the first exemplary embodiment described above, PC 3 provided in the store is caused to perform the processing necessary for monitoring. However, as illustrated in FIG. 1, PC 11 provided in the headquarters or cloud computer 12 that configures a cloud computing system may be caused to perform the processing necessary for monitoring. In addition, the processing tasks necessary for monitoring may be shared by a plurality of information processing devices and the information can be exchanged between the plurality of information processing devices via communication media such as an IP network or a LAN. In this case, the monitoring system is configured in the plurality of information processing devices that share the processing tasks necessary for monitoring.

In this configuration, PC 3 or the like provided in the store may be caused to perform at least processing of which the amount of calculation is large, for example, person detection processing among the processing tasks necessary for monitoring. In such a configuration described above, since the data amount of the information necessary for the remaining processing tasks can be reduced, even when the information processing device installed in a place other than the store, for example, PC 11 installed in the headquarter being able to be caused to perform the remaining processing tasks, it is possible to reduce the communication load. Therefore, it becomes easy to operate the system by a wide area network topology.

In addition, cloud computer 12 may be caused to perform at least processing of which the amount of calculation is large, for example, person detection processing among the processing tasks necessary for monitoring. In such a configuration described above, since the amount of calculation for the remaining processing tasks can be reduced, a high speed information processing device is not needed in the user side such as the store. Therefore, it is possible to reduce cost to the user to bear.

In addition, cloud computer 12 may be caused to perform all of the necessary processing, or cloud computer 12 may be caused to share at least moving image output processing among the necessary processing tasks. In such a configuration described above, the moving image can also be displayed on a mobile terminal such as smart phone 13 or tablet terminal 14 other than PC 3 or PC 11 installed in the store or in the headquarter. In this way, it is possible to check the situation in the store at an arbitrary place such as a visiting destination other than the store or the headquarters.

In addition, in the present exemplary embodiment, the description is made with a case where PC 3 installed in the store is caused to perform the processing tasks for monitoring, and monitor 7 in PC 3 is caused to display the monitoring screen or the target area input screen and PC 3 performs the necessary inputting and outputting. However, the necessary inputting and outputting may be performed by the information processing device other than the information processing device that performs the processing tasks necessary for the monitoring, for example, by PC 11 installed in the headquarter or a mobile terminal such as tablet terminal 14.

INDUSTRIAL APPLICABILITY

The monitoring device, the monitoring system and the monitoring method have advantageous effects of efficiently performing the monitoring operation by arranging the sub-image relating to the area designated on the monitored moving image at the appropriate position on the monitored moving image without the monitoring operation being hindered by the sub-image, and are useful as the monitoring device, the monitoring system and the monitoring method that generate the monitoring moving image in which the sub-image relating to the target area set on the monitored moving image is superimposed on the monitored moving image, and displays the monitoring moving image on the display device.

REFERENCE SIGNS LIST 1 camera
2 recorder
3 PC (monitoring device)
6 input device
7 monitor
11 PC
12 cloud computer
13 smart phone
14 tablet terminal
31 moving image acquirer
32 stay information acquirer
33 sub-image generator
34 sub-image arrangement controller
35 output controller
36 process condition setter (target area setter)
41 position information acquirer
42 position information accumulator
43 number-of-stays acquirer
44 time-of-stays acquirer
45 person detector
46 moving line information acquirer
51 target area determiner
52 candidate area evaluator
53 arrangement position determiner
61 arrangement position setting mode selector
62 size setting mode selector
63 magnification designator
64 size designator
71 imaging unit
72 controller in camera 1
73 controller in PC 3

The invention claimed is:
1. A monitoring device that generates a monitoring moving image in which a sub-image relating to a target area set on a monitored moving image is superimposed on the monitored moving image, and displays the monitoring moving image on a display, the device comprising:
- a target area setter that sets the target area on the monitored moving image according to a user's operation input;
- a stay information acquirer that observes a staying situation of a moving object appearing on the monitored moving image and acquires stay information indicating the staying situation of the moving object;
- a sub-image generator that generates the sub-image;
- a sub-image arrangement controller that controls an arrangement position of the sub-image on the monitored moving image based on the stay information acquired by the stay information acquirer; and
- an output controller that generates the monitoring moving image in which the sub-image is composed on the monitored moving image based on the arrangement position of the sub-image determined by the sub-image arrangement controller and outputs the monitoring moving image on the display,
- wherein the stay information includes information relating to a number-of-stays, which is the number of moving objects staying in the observation area set on the monitored moving image, and a time-of-stays, which is a time in which the moving object stays in the observation area.

2. The monitoring device according to claim 1,
wherein the sub-image arrangement controller determines the arrangement position of the sub-image based on the stay information under a condition that a relevance to the target area relating to the staying state of the moving object is low.

3. The monitoring device according to claim 2,
wherein the sub-image arrangement controller determines which of the staying state and the non-staying state the target area is in based on the stay information, in a case where the target area is determined to be in the staying state, determines the arrangement position of the sub-image under a condition that the values of both the number-of-stays and the time-of-stays are small, and in a case where the target area is determined to be in the non-staying state, determines the arrangement position of the sub-image under a condition that the value of the number-of-stays becomes small and the value of the time-of-stays becomes large.

4. The monitoring device according to claim 2,
wherein the sub-image arrangement controller acquires an evaluation value indicating a degree of the relevance between a plurality of candidate areas which is a candidate for the arrangement position of the sub-image and the target area based on the stay information, selects the best candidate area under a condition that the evaluation value is small, and determines the arrangement position of the sub-image based on the selected candidate area.

5. The monitoring device according to claim 1,
wherein the sub-image arrangement controller detects a direction of the moving object appearing on the original image of the target area and determines the arrangement position of the sub-image based on the detection result.

6. The monitoring device according to claim 1,
wherein the sub-image generator generates an enlarged image which is enlarged from the original image of the target area as the sub-image.

7. A monitoring system that generates a monitoring moving image in which a sub-image relating to a target area set on a monitored moving image is superimposed on the monitored moving image, and displays the monitoring moving image on a display device, the system comprising:
- a camera that images the monitoring area;
- a plurality of information processing devices; and
- a display that displays the monitoring moving image,
- wherein any of the plurality of information processing devices includes
  - a target area setter that sets the target area on the monitored moving image according to a user's operation input;
  - a stay information acquirer that observes a staying situation of a moving object appearing on the monitored moving image and acquires stay information indicating the staying situation of the moving object;
  - a sub-image generator that generates the sub-image;
  - a sub-image arrangement controller that controls an arrangement position of the sub-image on the monitored moving image based on the stay information acquired by the stay information acquirer; and
  - an output controller that generates the monitoring moving image in which the sub-image is composed on the monitored moving image based on the arrangement position of the sub-image determined by the sub-image arrangement controller and outputs the monitoring moving image on the display,
  - wherein the stay information includes information relating to a number-of-stays, which is the number of moving objects staying in the observation area set on the monitored moving image, and a time-of-stays, which is a time in which the moving object stays in the observation area.

8. A monitoring method in which an information processing device is caused to generate a monitoring moving image in which a sub-image relating to a target area set on a monitored moving image is superimposed on the monitored moving image, and to display the monitoring moving image on a display, the method comprising:
- setting the target area on the monitored moving image according to a user's operation input;
- observing a staying situation of a moving object appearing on the monitored moving image and acquiring stay information indicating the staying situation of the moving object;
- generating the sub-image;
- controlling an arrangement position of the sub-image on the monitored moving image based on the stay information; and
- generating the monitoring moving image in which the sub-image is composed on the monitored moving image based on the arrangement position of the determined sub-image and outputting the monitoring moving image on the display,
- wherein the stay information includes information relating to a number-of-stays, which is the number of moving objects staying in the observation area set on the monitored moving image, and a time-of-stays, which is a time in which the moving object stays in the observation area.

* * * * *